(12) United States Patent
Itogawa et al.

(10) Patent No.: US 7,949,206 B2
(45) Date of Patent: May 24, 2011

(54) SCANNED IMAGE MANAGEMENT DEVICE

(75) Inventors: Akira Itogawa, Tokyo (JP); Yohei Yamamoto, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 979 days.

(21) Appl. No.: 11/608,038

(22) Filed: Dec. 7, 2006

(65) Prior Publication Data

US 2007/0133064 A1    Jun. 14, 2007

(30) Foreign Application Priority Data

Dec. 12, 2005 (JP) .................................. 2005-357618
Nov. 28, 2006 (JP) .................................. 2006-320472

(51) Int. Cl.
*G06K 9/60* (2006.01)
*G06F 7/00* (2006.01)
*G06F 17/30* (2006.01)

(52) U.S. Cl. ...................................... 382/305; 707/706
(58) Field of Classification Search .................. 382/305; 707/706, 707, 708
See application file for complete search history.

(56) References Cited

U.S. PATENT DOCUMENTS

| 7,086,000 | B2 * | 8/2006 | LaMarca et al. ............... 715/234 |
| 2003/0039410 | A1 * | 2/2003 | Beeman et al. ............... 382/305 |
| 2006/0083442 | A1 * | 4/2006 | Loukipoudis et al. ........ 382/305 |
| 2006/0085442 | A1 * | 4/2006 | Fujiwara ....................... 707/100 |
| 2006/0206470 | A1 * | 9/2006 | McIntyre .......................... 707/3 |

FOREIGN PATENT DOCUMENTS

JP    2003-345920    12/2003

* cited by examiner

*Primary Examiner* — John B Strege
(74) *Attorney, Agent, or Firm* — Oblon, Spivak, McClelland, Maier & Neustadt, L.L.P.

(57) ABSTRACT

A scanned image management device comprises a receiving unit which receives a scanned image. A selecting unit causes a user to select a tag from among a set of pre-defined tags or newly generated tags. A first registering unit generates an image-to-tag association between a scanned image and a selected tag to register the scanned image with the image-to-tag association. A second registering unit generates a tag-to-tag association between tags independently defined for scanned images to register the tag-to-tag association. A retrieving unit retrieves a target scanned image by using the selected tag, the image-to-tag association, and the tag-to-tag association.

12 Claims, 45 Drawing Sheets

FIG.3

IMAGE TABLE 281

| IMAGE ID | IMAGE |
|---|---|
| 1 | |
| 2 | |
| 3 | |
| ... | ... |

RELEVANCE TABLE 282

| IMAGE ID | TAG ID |
|---|---|
| 1 | 11 |
| 1 | 12 |
| 3 | 14 |
| ... | ... |

RELEVANCE TAG TABLE 283

| TAG ID | RELEVANCE TAG ID |
|---|---|
| 11 | 14, 16 |
| 12 | 15, 16, 18 |
| 13 | 17 |
| ... | ... |

TAG TABLE 284

| TAG ID | TAG CHARACTER STRING |
|---|---|
| 11 | OPERATING GUIDE |
| 12 | MANUAL |
| 13 | 1G |
| ... | ... |

FIG.5

IMAGE TABLE 281

| IMAGE ID | IMAGE FILE |
|---|---|
| 1 | |
| 2 | |
| 3 | |
| ... | ... |

RELEVANCE TABLE 282

| TAG ID | IMAGE ID | RELEVANCE TAG ID |
|---|---|---|
| 11 | 1 | 14,16 |
| 12 | 2 | 15,16,18 |
| 13 | 4 | 17 |
| ... | ... | ... |

TAG TABLE 284

| TAG ID | TAG CHARACTER STRING |
|---|---|
| 11 | OPERATING GUIDE |
| 12 | MANUAL |
| 13 | 1G |
| ... | ... |

TAG TABLE

| TAG ID | TAG CHARACTER STRING | RELEVANCE TAG ID |
|---|---|---|
| 1 | SETTLEMENT | 5 |
| 2 | ORGANIZATION | null |
| 3 | PLAN "A" | 2,7,8 |
| ... | ... | ... |

FIG.9

```
<OBJECT ID="obj"  CLASSID="GUID OF LIBRARY INTRINSIC TO MFP"></OBJECT>
<script type="text/javascript">
function isMFP() {
        try{
                obj.GetScanProperty("0");
                return true;
        } catch(e) {
                return false;
        }
}
</script>
```

```
select distinct tag from tagTable as A
    where A.id in (select id from tagTable
    where tag = <RETRIEVAL WORDS>);
```

SCANNED IMAGE MANAGEMENT DEVICE

BACKGROUND OF THE INVENTION

1. Field of the Invention

The present invention relates to a scanned image management device in which the ease of retrieval and the reusability of scanned and registered images are increased.

2. Description of the Related Art

In recent years, although the electronization of documents in offices is progressing considerably, a considerable number of paper documents received from the outside and a considerable number of handwritten paper documents also exist.

In order to unify such a large number of paper documents electronically and to manage them efficiently, it is proposed that paper documents are scanned by a scanner function, such as in an MFP (multi-function peripheral), and the scanned images are stored as image files so that management of the image files is performed.

Conventionally, the scanned images are merely entered into folders of a directory type storage system, which folders are classified, for example, on a date-stamp basis, on an operator basis, or on an organization basis.

On the other hand, Japanese Laid-Open Patent Application No. 2003-345920 discloses a document management method which is adapted to provide a document management service to a remote user via a network with good flexibility in an efficient manner.

Since the scanned images conventionally are entered into the folders of the directory type storage system as mentioned above, there has been a problem that, even if the user wishes to acquire a certain scanned image subsequently, the user has only a few search keys suitable to acquire it, and the ease of retrieval and the reusability of the scanned images are low.

SUMMARY OF THE INVENTION

According to one aspect of the invention, there is provided an improved scanned image management device in which the above-described problems are eliminated.

According to one aspect of the invention, there is provided a scanned image management device which is adapted to increase the ease of retrieval and the reusability of scanned images.

In an embodiment of the invention which solves or reduces one or more of the above-mentioned problems, there is provided a scanned image management device comprising: a receiving unit receiving a scanned image; a selecting unit causing a user to select a tag from among a set of pre-defined tags or newly generated tags; a first registering unit generating an image-to-tag association between a scanned image and a selected tag to register the scanned image with the image-to-tag association; a second registering unit generating a tag-to-tag association between tags independently defined for scanned images to register the tag-to-tag association; and a retrieving unit retrieving a target scanned image by using the selected tag, the image-to-tag association, and the tag-to-tag association.

The above-mentioned scanned image management device may be configured so that the scanned image management device further comprises a relevance tag setting unit determining automatically a relevance tag which is set with respect to the tag associated with the scanned image.

The above-mentioned scanned image management device may be configured so that the scanned image management device further comprises a tag deletion unit deleting the tag associated with the scanned image.

The above-mentioned scanned image management device may be configured so that the scanned image management device further comprises a tag addition unit adding a newly generated tag which is associated with the scanned image.

The above-mentioned scanned image management device may be configured so that the scanned image management device further comprises a UI screen generating unit generating a user-interface screen which is displayed on an operation panel of a multi-function peripheral or a display monitor of a personal computer.

The above-mentioned scanned image management device may be configured so that the UI screen generating unit generates a user-interface screen which is displayed on the operation panel of the multi-function peripheral, the user-interface screen including a scanning waiting screen as a startup screen, a tag presentation screen for performing setting of relevance tags, and an image-presentation/tag-change/printing screen for performing image checking, tag changing and image printing.

The above-mentioned scanned image management device may be configured so that the UI screen generating unit generates a user-interface screen which is displayed on the display screen of the personal computer, the user-interface screen including a retrieval screen as a startup screen, a tag presentation screen for performing setting of relevance tags, and an image-presentation/tag-change screen for performing image checking and tag changing.

The above-mentioned scanned image management device may be configured so that the scanned image management device comprises: an image table in which image IDs and image files are associated and managed; a relevance table in which image IDs and tag IDs are associated and managed; a relevance tag table in which tag IDs and relevance tag IDs are associated and managed; and a tag table in which tag IDs and tag character strings are associated and managed.

The above-mentioned scanned image management device may be configured so that the scanned image management device comprises: an image table operation unit configured to operate the image table; a relevance table operation unit configured to operate the relevance table; a relevance tag table unit configured to operate the relevance tag table; and a tag table operation unit configured to operate the tag table.

In an embodiment of the invention which solves or reduces one or more of the above-mentioned problems, there is provided a scanned image management method comprising: receiving a scanned image; causing a user to select a tag from among a set of pre-defined tags or newly generated tags; generating an image-to-tag association between a scanned image and a selected tag to register the scanned image with the image-to-tag association; generating a tag-to-tag association between tags independently defined for scanned images to register the tag-to-tag association; and retrieving a target scanned image by using the selected tag, the image-to-tag association, and the tag-to-tag association.

The scanned image management device in the embodiment of the invention is constructed by using the so-called tag system, associations between tags independently defined for scanned images are generated arbitrarily and registered, and it is possible to increase the ease of retrieval and the reusability of the scanned images.

BRIEF DESCRIPTION OF THE DRAWINGS

Other objects, features and advantages of the present invention will be apparent from the following detailed description when reading in conjunction with the accompanying drawings.

FIG. 3 is a diagram showing an example of the structure of a database.

FIG. 5 is a diagram showing an example of the structure of a database.

FIG. 9 is a diagram for explaining an example of the method of distinguishing an operation panel and a display screen.

DETAILED DESCRIPTION OF PREFERRED EMBODIMENTS

A description will be given of embodiments of the invention with reference to the accompanying drawings.

Figure 1:
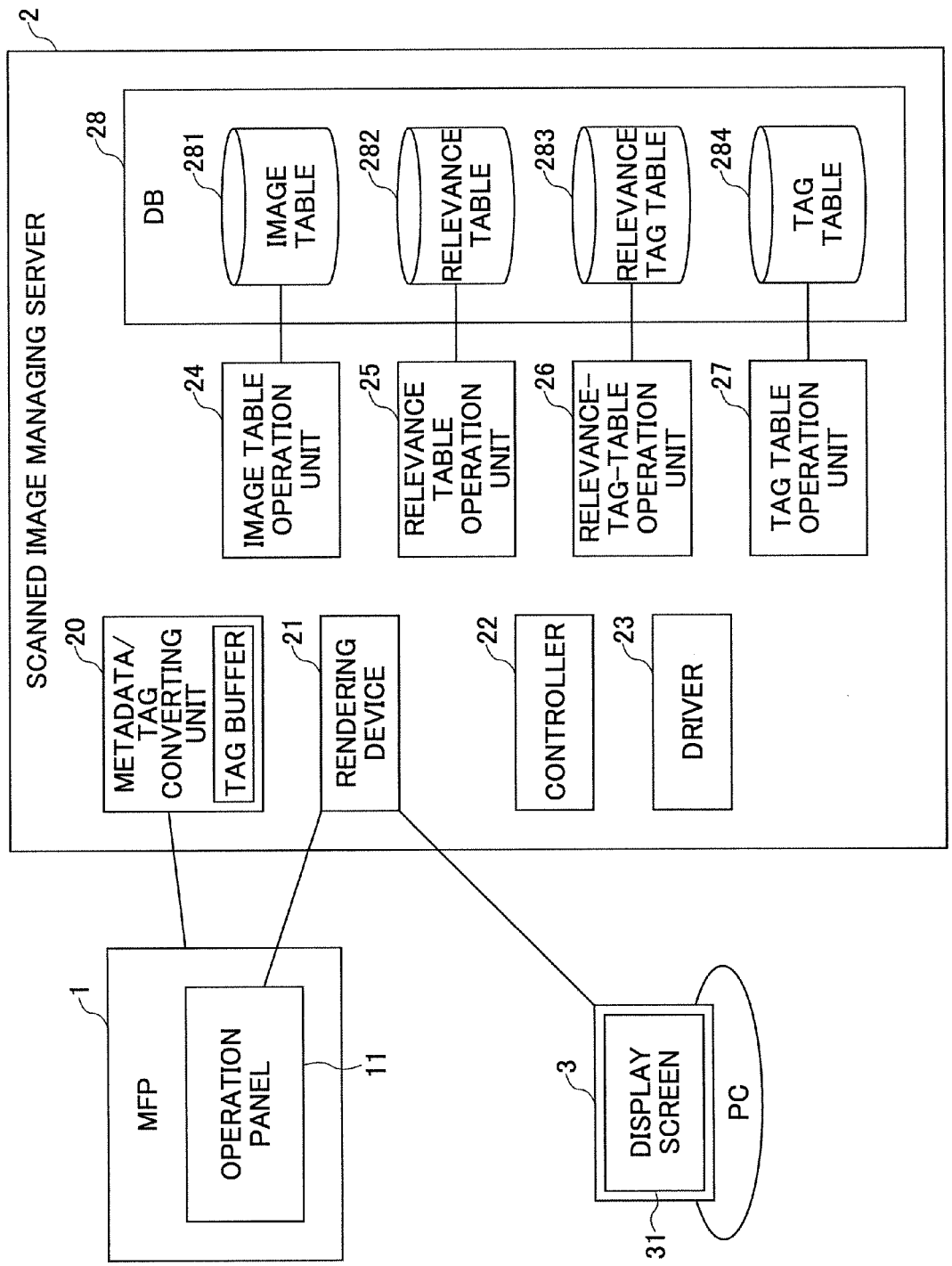
FIG. 1 is a block diagram showing the composition of a scanned image management system in an embodiment of the invention.

FIG. 1 is a block diagram showing the composition of a scanned image management system in an embodiment of the invention.

As shown in FIG. 1, this scanned image management system comprises an MFP (multi-function peripheral) 1 having a scanner function, a scanned image managing server 2 which receives a scanned image from the MFP 1 and assigns a tag to the scanned image to perform management of the scanned image, and a PC (personal computer) 3 which is connected to the scanned image managing server 2. The MFP 1, the scanned image managing server 2, and the PC 3 are interconnected by a network.

The number of the MFPs 1 and the number of the PCs 3 may be set to an arbitrary number depending on the scale of the organization in which this scanned image management system is introduced. And the scanned image managing server 2 may be constituted by a single server device, or two or more server devices wherein the functions thereof are distributed.

The MFP 1 comprises an operation panel 11 on which a UI (user interface) is provided by a Web browser or the like. The MFP 1 is adapted to perform scanning operation of documents, relevance tag (which will be mentioned later) setting operation, image confirmation operation, tag change operation, printing operation, etc.

The PC 3 comprises a display screen 31 on which a UI screen provided by a Web browser or the like is displayed. The PC 3 is adapted to perform retrieving operation, relevance tag setting operation, image confirmation operation, tag change operation, etc.

The scanned image managing server 2 comprises a metadata/tag converting unit 20 which acquires the metadata (scanning time, login user ID, device ID, scanning resolution, color/monochrome distinction) from the MFP 1 when scanning of a document is performed. The metadata/tag converting unit 20 acquires a set of pre-defined tags from a tag table 284 of a database (DB) 28 (which will be mentioned later) to generate a tag. The metadata/tag converting unit 20 is provided with a tag buffer which holds temporarily the tag elements which are selected by the user as being tags to be given to the scanned images.

The scanned image managing server 2 further comprises a rendering device 21, a controller 22, and a driver 23.

The rendering device 21 generates a UI screen (rendering) which is displayed on the operation panel 11 of the MFP 1 or a display screen 31 of the PC 3. The controller 22 receives a printing instruction from the MFP 1 and controls a printing operation. The driver 23 controls the actual printing operation by the MFP 1.

Moreover, the scanned image managing server 2 further comprises an image table operation unit 24, a relevance table operation unit 25, a relevance-tag-table operation unit 26, and a tag table operation unit 27.

The image table operation unit 24 is configured to operate an image table 281 of the database 28. The relevance table operation unit 25 is configured to operate a relevance table 282 of the database 28. The relevance-tag-table operation unit 26 is configured to operate a relevance tag table 283 of the database 28. The tag table operation unit 27 is configured to operate the tag table 284 of the database 28.

Figure 2:
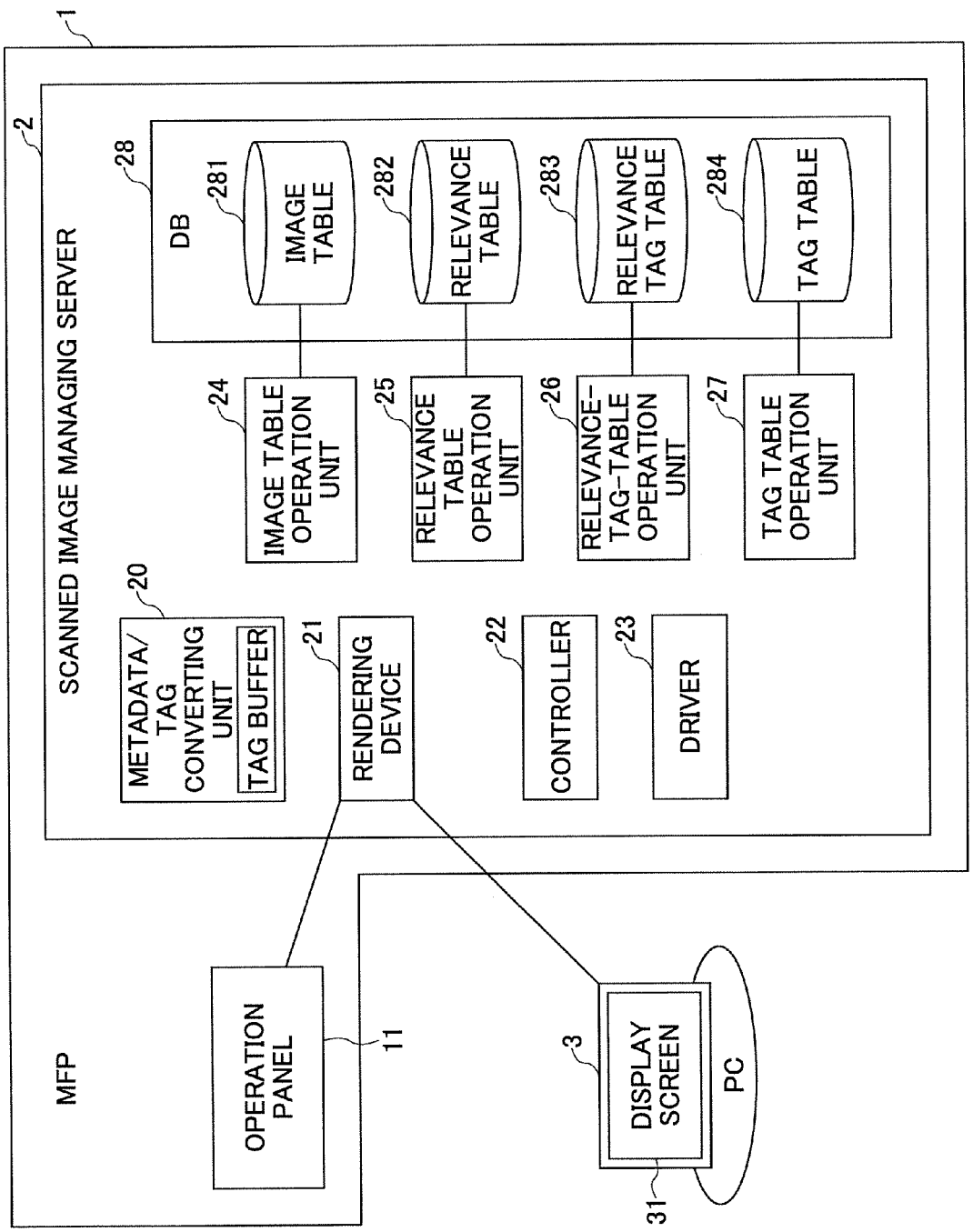
FIG. 2 is a block diagram showing the composition of a scanned image management system in an embodiment of the invention.

FIG. 2 is a block diagram showing the composition of a scanned image management system in an embodiment of the invention. In this scanned image management system, the functions of the scanned image managing server 2 are provided within the MFP 1.

The composition of the scanned image managing server 2 shown in FIG. 2 is essentially the same as that of the embodiment shown in FIG. 1, and a description thereof will be omitted. By using this composition, it is possible to facilitate introduction of the scanned image managing server 2, and it is possible to facilitate server management.

FIG. 3 is a diagram showing an example of the structure of a database 28. As shown in FIG. 3, the image table 281 is provided so that image IDs and image files are associated and managed. The relevance table 282 is provided so that image IDs and tag IDs are associated and managed. The relevance tag table 283 is provided so that tag IDs and relevance tag IDs are associated and managed. The tag table 284 is provided so that tag IDs and tag character strings (indicating tag contents) are associated and managed.

It is supposed that a set of predefined tags which are expected to be used is stored into the tag table 284. The set of predefined tags may include, for example, a set of project names, a set of organization names, etc.

Figure 4:
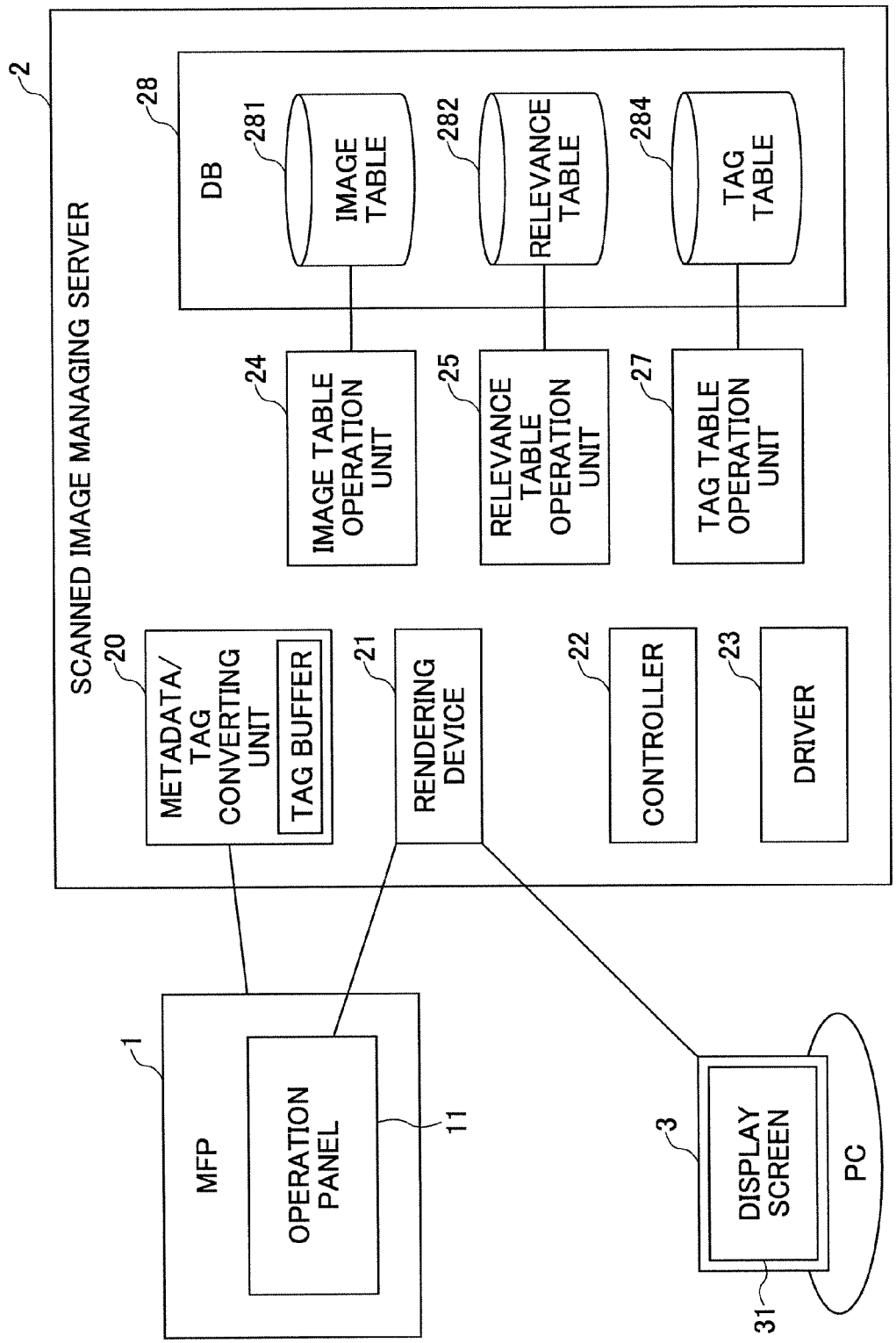
FIG. 4 is a diagram showing the composition of a scanned image management system in an embodiment of the invention.

FIG. 4 is a diagram showing the composition of a scanned image management system in an embodiment of the invention. As shown in FIG. 4, the relevance table 282 and the relevance tag table 283 shown in FIG. 1 are combined into the relevance table 282. This composition is also applicable to the scanned image management system shown in FIG. 2 wherein the functions of scanned image managing server 2 are provided within the MFP 1.

FIG. 5 is a diagram showing an example of the structure of a database 28 for use in the composition of FIG. 4. As shown in FIG. 5, the image table 281 is provided so that image IDs and image files are associated and managed. The relevance table 282 is provided so that tag IDs, image IDs, and relevance tag IDs are associated and managed. The tag table 284 is provided so that tag IDs and tag character strings are associated and managed.

It is supposed that a set of predefined tags which are expected to be used is stored into the tag table 284. The set of predefined tags may include, for example, a set of project names, a set of organization names, etc.

Figure 6:
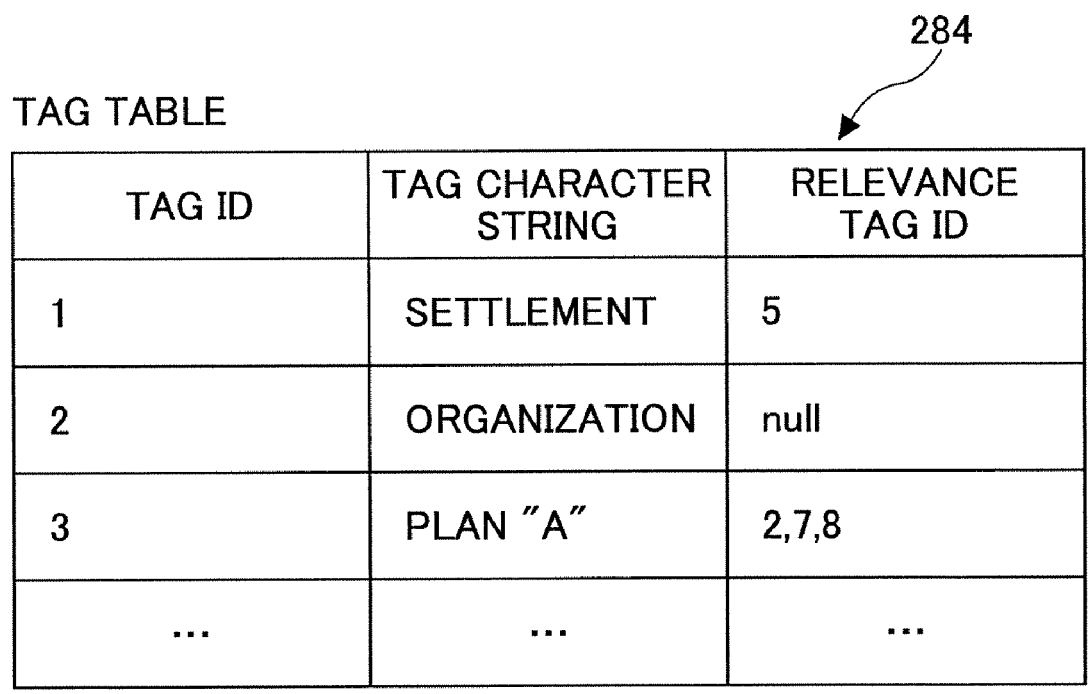
FIG. 6 is a diagram showing an example of the structure of a tag table.

FIG. 6 is a diagram showing an example of the structure of a tag table 284. As shown in FIG. 6, this tag table 284 is provided so that tag IDs, tag character strings, and relevance tag IDs are associated and managed. As the relevance tag ID in this case, invalid value "null" may be used.

Figure 7:
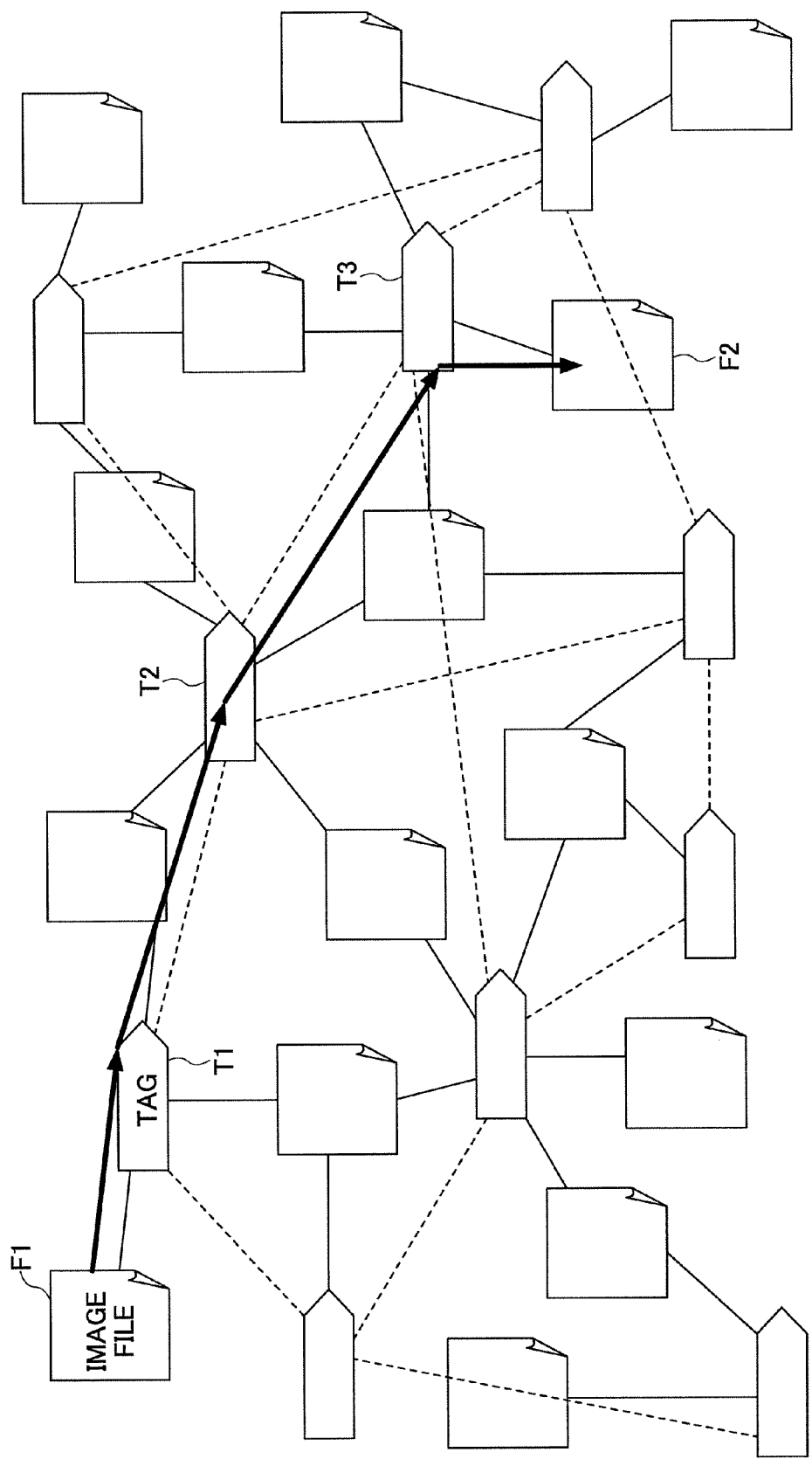
FIG. 7 is a diagram for explaining the management of scanned images by tags.

FIG. 7 is a diagram for explaining the management of scanned images by tags. In the example of FIG. 7, it is illustrated by the thick-line arrows that a target image file F2 can be retrieved from the tag T1, which is given to the image file F1, through the relevance tags T2 and T3 which are associated with the tag T1. In the example of FIG. 7, the solid line indicates an association between a tag and an image file, and the dotted line indicates an association between tags independently defined for image files. In this manner, the retrieval of the target scanned image can be carried out through the tags with good flexibility.

Figure 8:
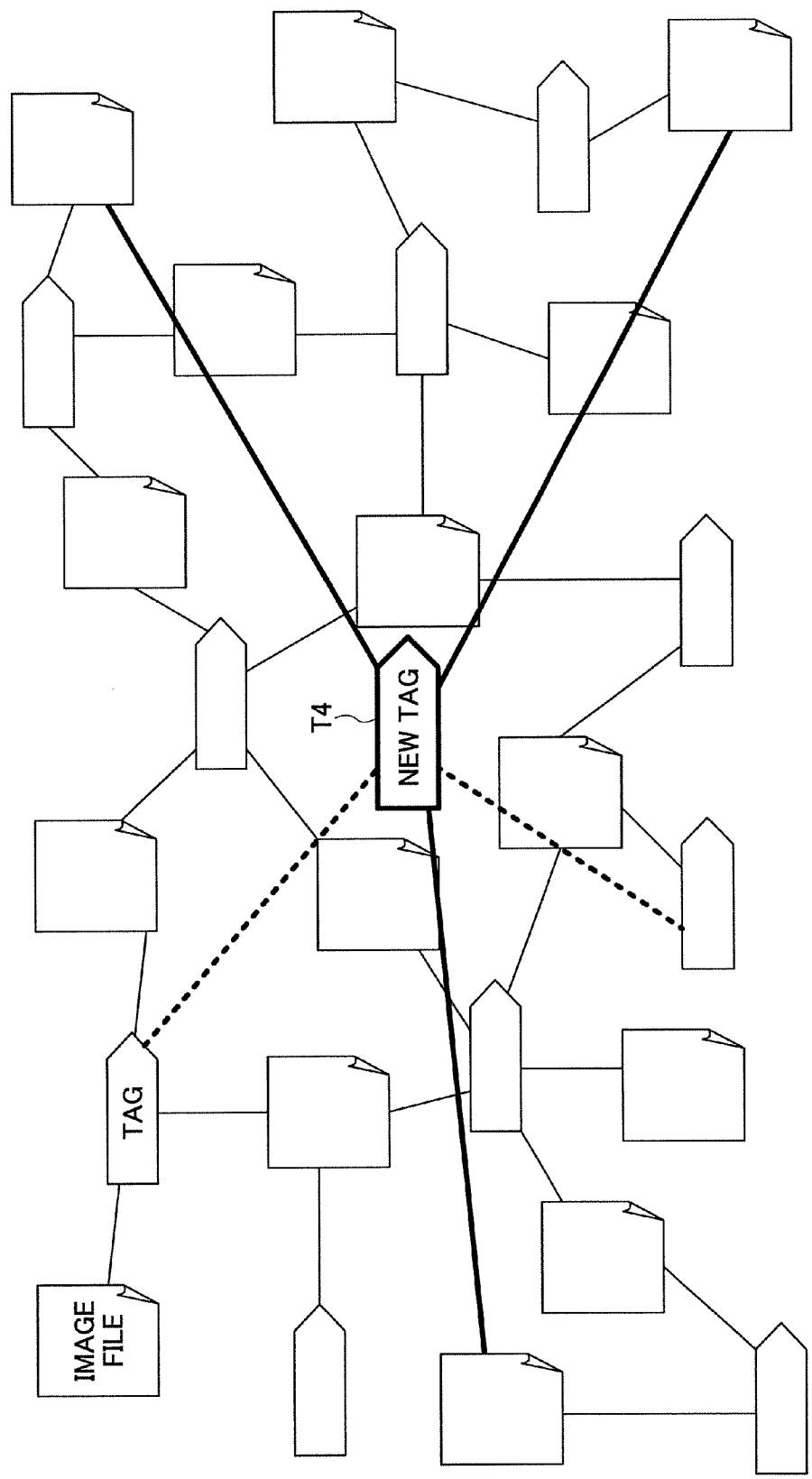
FIG. 8 is a diagram for explaining the management of scanned images by tags.

FIG. 8 is a diagram for explaining the management of scanned images by tags. In the example of FIG. 8, the user is permitted to create a new tag T4 associated with other image files and other tags. In the example of FIG. 8, the thick solid line indicates an association between the new tag T4 and another image file, and the thick dotted line indicates an association between the new tag T4 and another tag. In this manner, it is possible to attain presentation of a different view and discovery of an unexpected association with the newly created tag T4.

Next, operation of the above-mentioned embodiment will be explained.

Referring back to FIG. 1 and FIG. 2, the rendering device 21 of the scanned image managing server 2 creates a UI screen which is displayed on the operation panel 11 of the MFP 1, or the display screen 31 of the PC 3. On the operation panel 11 of the MFP 1, the input of character strings is difficult for the user to perform. On the other hand, on the display screen 31 of the PC 3, the input of character strings is easy for the user to perform. For this reason, the composition of the UI screen differs between the operation panel 11 and the display screen 31.

FIG. 9 is a diagram for explaining an example of the method of distinguishing the operation panel 11 and the display screen 31. In the example of FIG. 9, the method of distinguishing the operation panel 11 and the display screen 31 is defined by a set of program codes utilizing the ActiveX. When the program codes of FIG. 9 are executed by the Web browser of the MFP 1 or the PC 3, accessing of the library intrinsic to the MFP is performed. When the accessing succeeds, it is determined that the UI screen is provided for the MFP 1. Otherwise, it is determined that the UI screen is provided for the PC 3.

Figure 10:
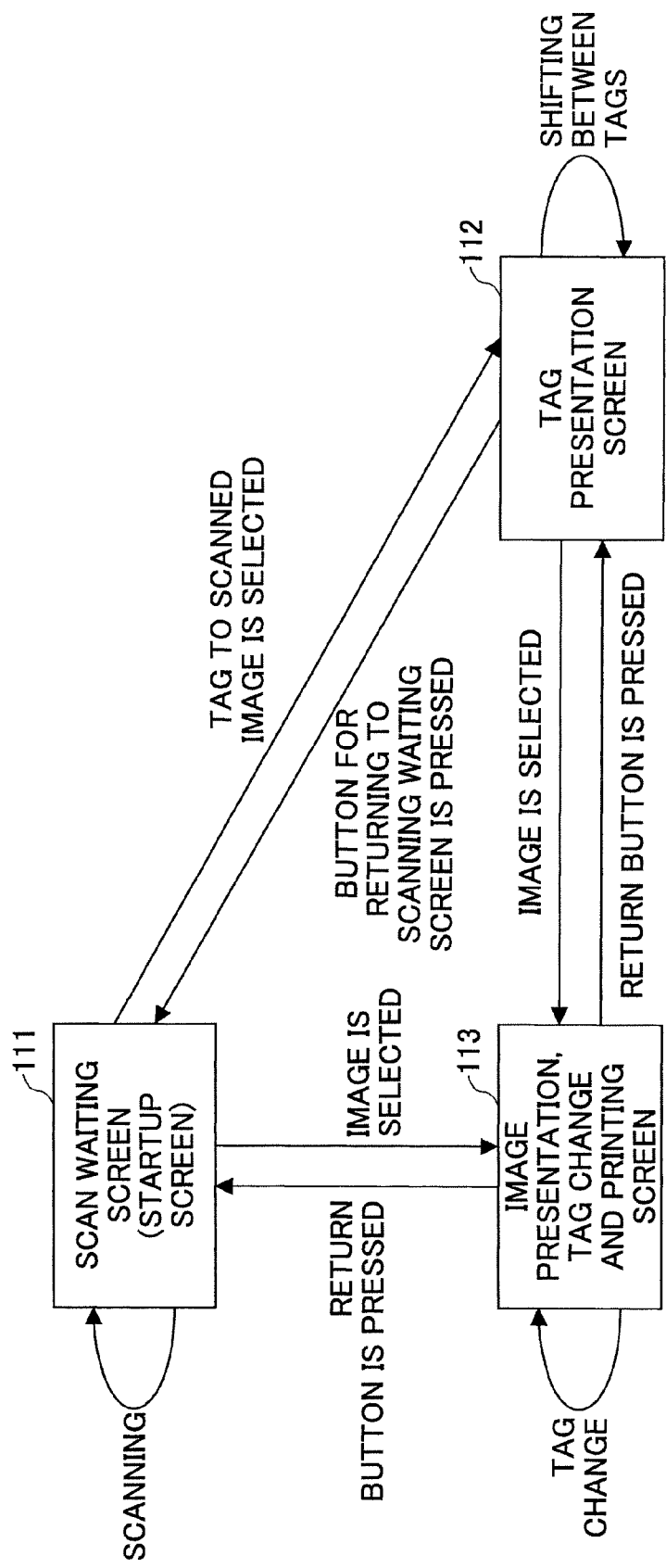
FIG. 10 is a diagram for explaining an example of the screen transition of an operation panel.

Next, operation of the MFP 1 will be explained. FIG. 10 is a diagram for explaining an example of the screen transition of the operation panel 11 of the MFP 1. As shown in FIG. 10, the display screen of the operation panel 11 changes in a cyclic manner between a scanning waiting screen 111 which is a startup screen, a tag presentation screen 112 for performing the setting of relevance tags, and an image-presentation/tag-change/printing screen 113 for performing image checking, tag changing, image printing, etc.

That is, the display screen changes to the tag presentation screen 112 by choosing the tag given to the scanned image in the scanning waiting screen 111. It returns back to the scanning waiting screen 111 by pressing the return button for returning to the scanning waiting screen. The display screen changes to the image-presentation/tag-change/printing screen 113 by choosing the image in the scanning waiting screen 111. It returns back to the scanning waiting screen 111 by pressing the return button. The display screen changes to the image-presentation/tag-change/printing screen 113 by choosing the image in the tag presentation screen 112. It returns back to the tag presentation screen 112 by pressing the return button.

Figure 11:
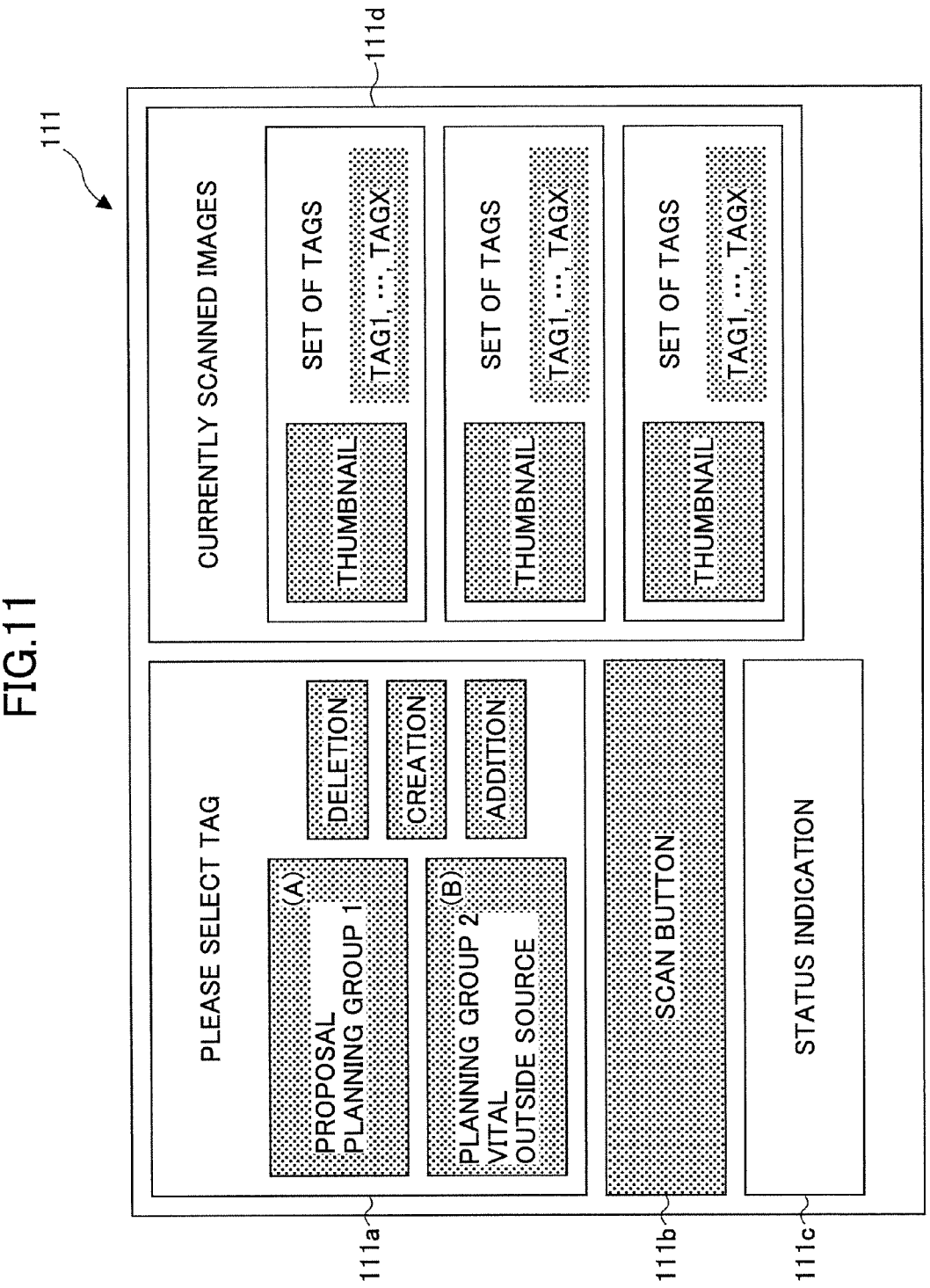
FIG. 11 is a diagram showing an example of a scanning waiting screen.

FIG. 11 is a diagram showing an example of the scanning waiting screen 111. As shown in FIG. 11, this scanning waiting screen 111 comprises an area 111a in which a tag given to the image to be scanned and registered is selected, an area 111b in which the scan button is provided, an area 111c in which the status indication, such as "scanning in progress", is displayed, and an area 111d in which a thumbnail (reduced image) and tags are displayed for each of currently scanned images. In FIG. 11, the shaded part is given to indicate the portion of the display screen which can be clicked or pressed by the user.

A set of candidate tags is displayed on the frame B of the area 111a in the screen of FIG. 11 by the rendering device 21, arbitrary tags are selected from among these tags, and they are added to the frame A by pressing the addition button. A new tag with a randomly named character string is added to the frame A by pressing the creation button. The name of this new tag can be changed into an arbitrary name through the operation of the PC 3 which will be mentioned later. When a tag in the frame A is selected and the deletion button is pressed, the selected tag can be deleted.

There are several methods of presentation of the tags which are to be displayed on the frame B of the area 111a. For example, such presentation methods are as follows:
(1) the tags of the currently scanned images are presented;
(2) the tags with low frequency of use are presented;
(3) the tags with low frequency of reference to the image are presented (in this case, the entry of reference frequency is added to the image table 281 and managed);
(4) the tags generated at random are presented.

Figure 12:
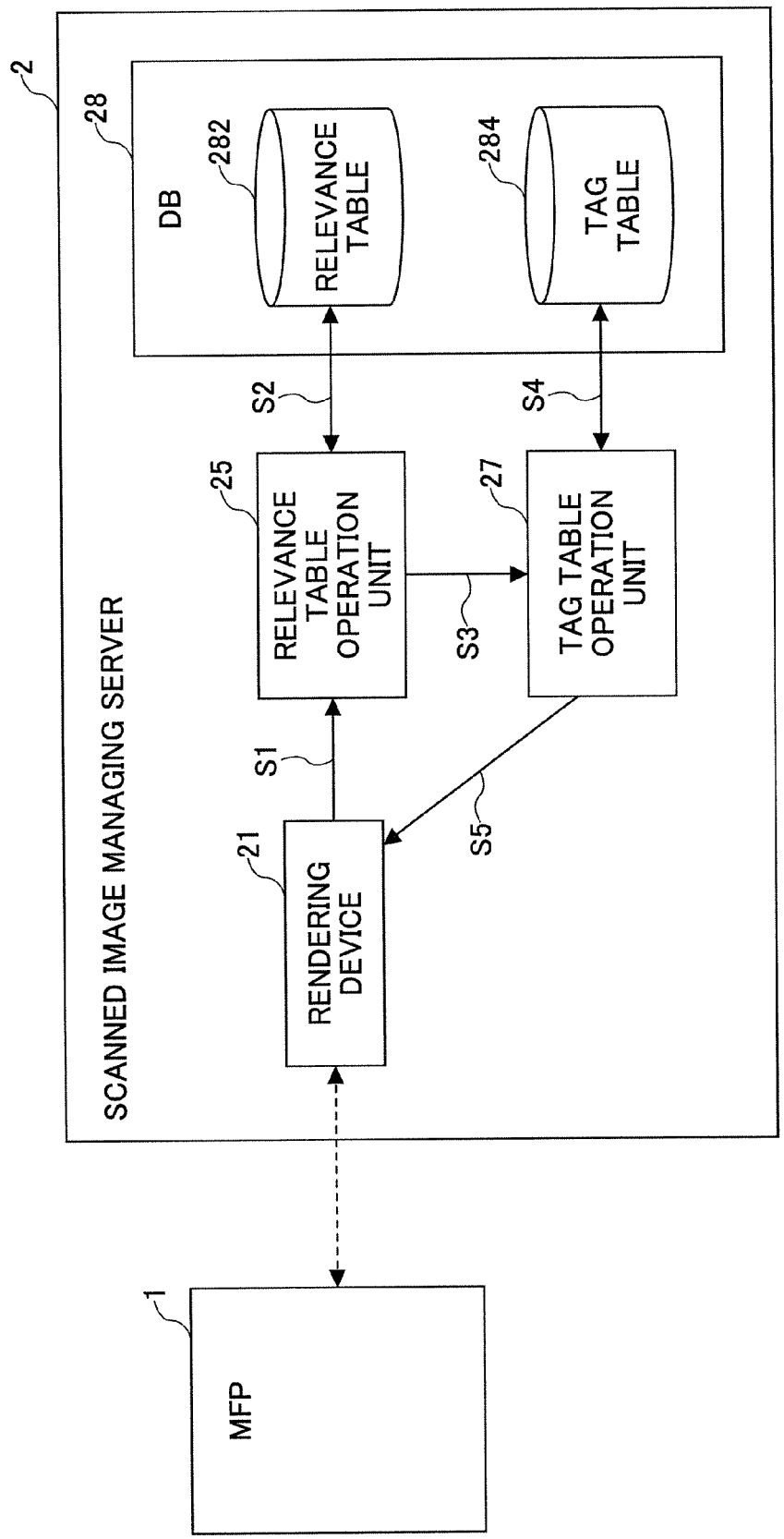
FIG. 12 is a diagram showing the procedure of presentation of tags with low frequency of use.
Figure 13:
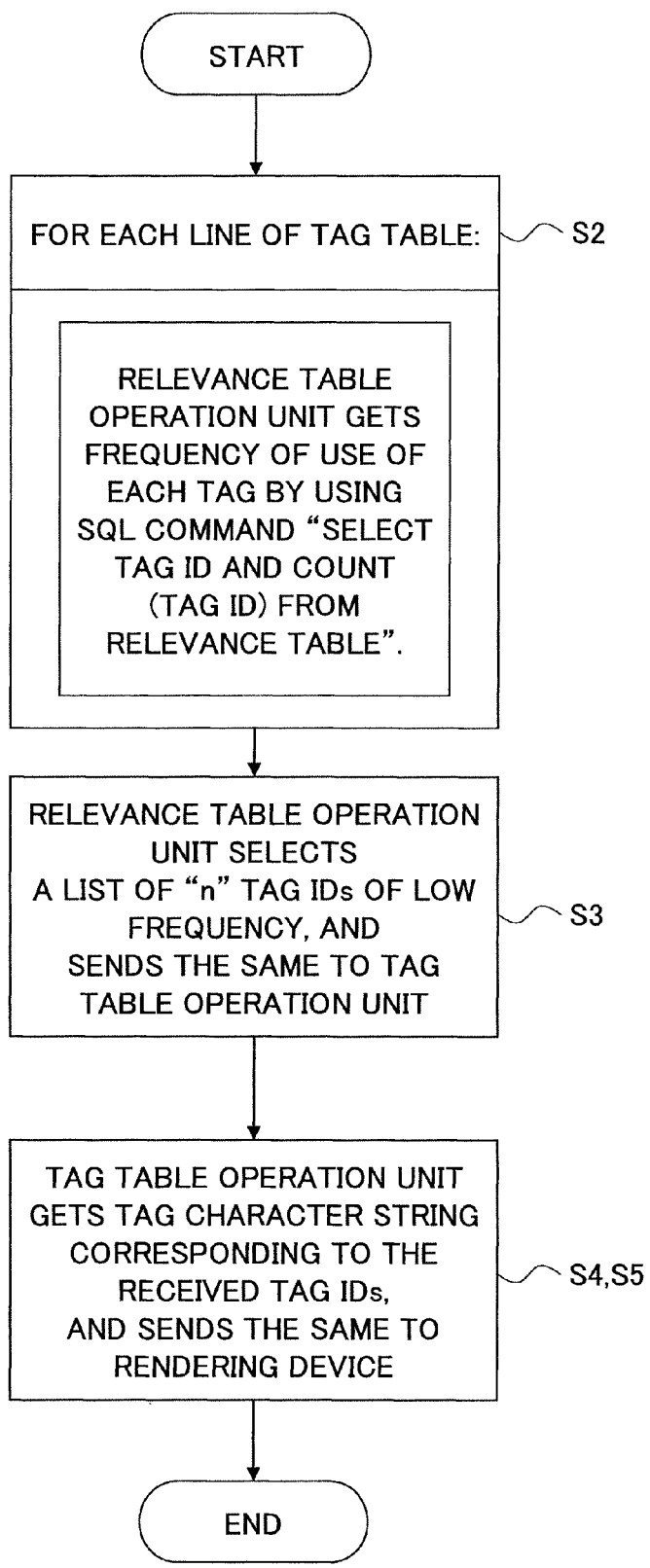
FIG. 13 is a flowchart for explaining the procedure of presentation of tags with low frequency of use.

FIG. 12 is a diagram showing the procedure of presentation of tags with low frequency of use, and FIG. 13 is a flowchart for explaining the procedure of presentation of tags with low frequency of use.

As shown in FIG. 12 and FIG. 13, when displaying the scanning waiting screen 111, the rendering device 21 of the scanned image managing server 2 requests the relevance table operation unit 25 to acquire the tags (step S1).

The relevance table operation unit 25 acquires the frequency of use for every tag ID in the relevance table 282 of the database 28, by using, for example, a SQL (structured query language) command, such as "select tag id and count (tag id) from relevance table" (step S2).

A list including a given number of tag IDs with low frequency of use is transmitted to the tag table operation unit 27 (step S3). The tag table operation unit 27 acquires a set of tag character strings, corresponding to the tag IDs contained in the received list, from the tag table 284 (step S4). The tag table operation unit 27 transfers the set of tag character strings to the rendering device 21 (step S5). The rendering device 21 displays the set of tag character strings received, as being candidate character strings on the operation panel of the MFP 1.

Figure 14:
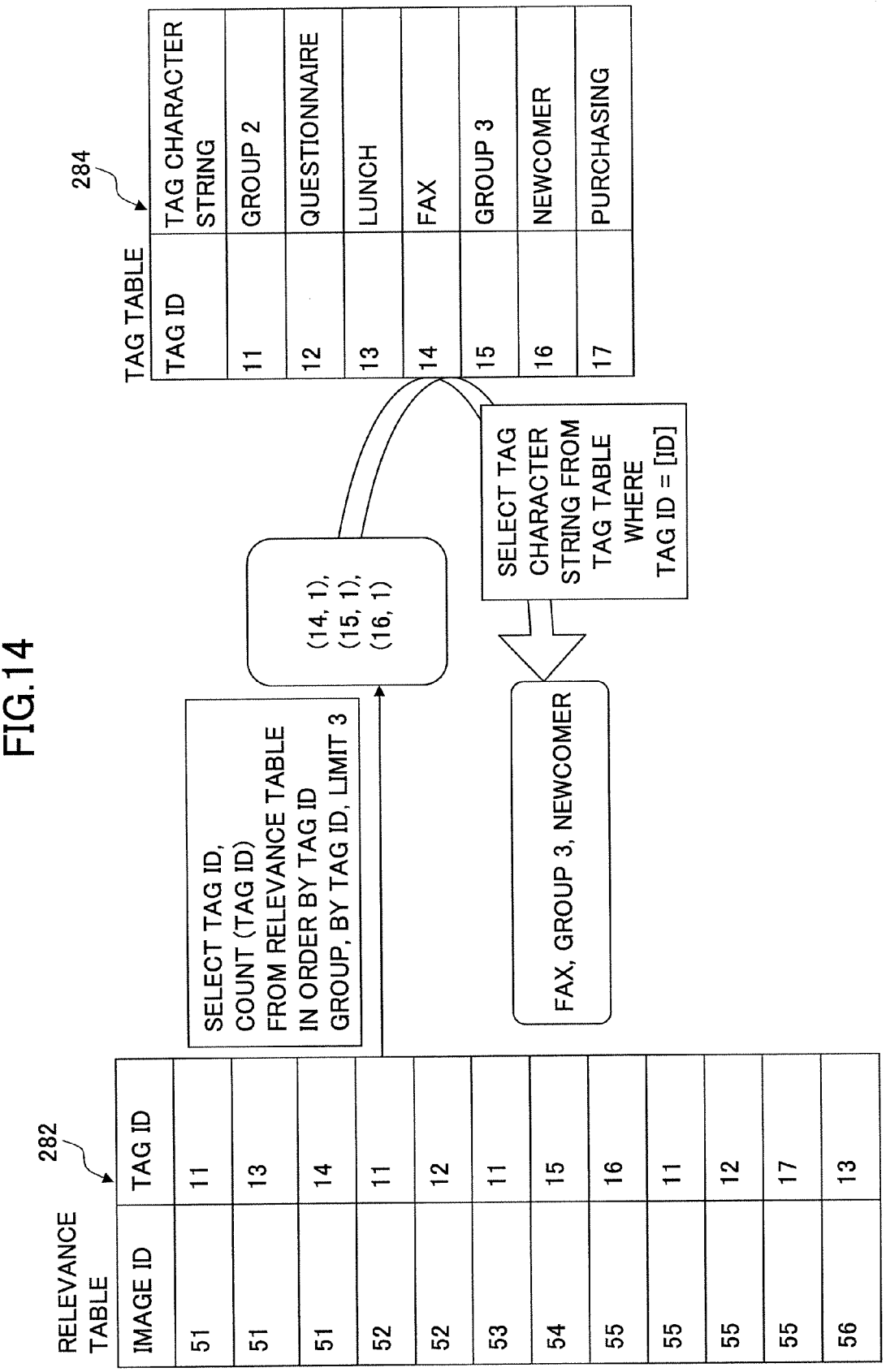
FIG. 14 is a diagram showing the database operation in presentation of tags with low frequency of use.

FIG. 14 is a diagram showing the database operation in presentation of tags with low frequency of use. In the example of FIG. 14, the SQL command "select tag id and count (tag id) from relevance table order by tag id group by tag id limit 3" is performed with respect to the relevance table 282, and the list "(14, 1), (15, 1), (16, 1)" is acquired. The SQL command "select tag character string from the tag table where tag id= [ID]" is performed with respect to the tag table 284, and the set of tag character strings "fax, group 3, newcomer" is acquired.

Figure 15:
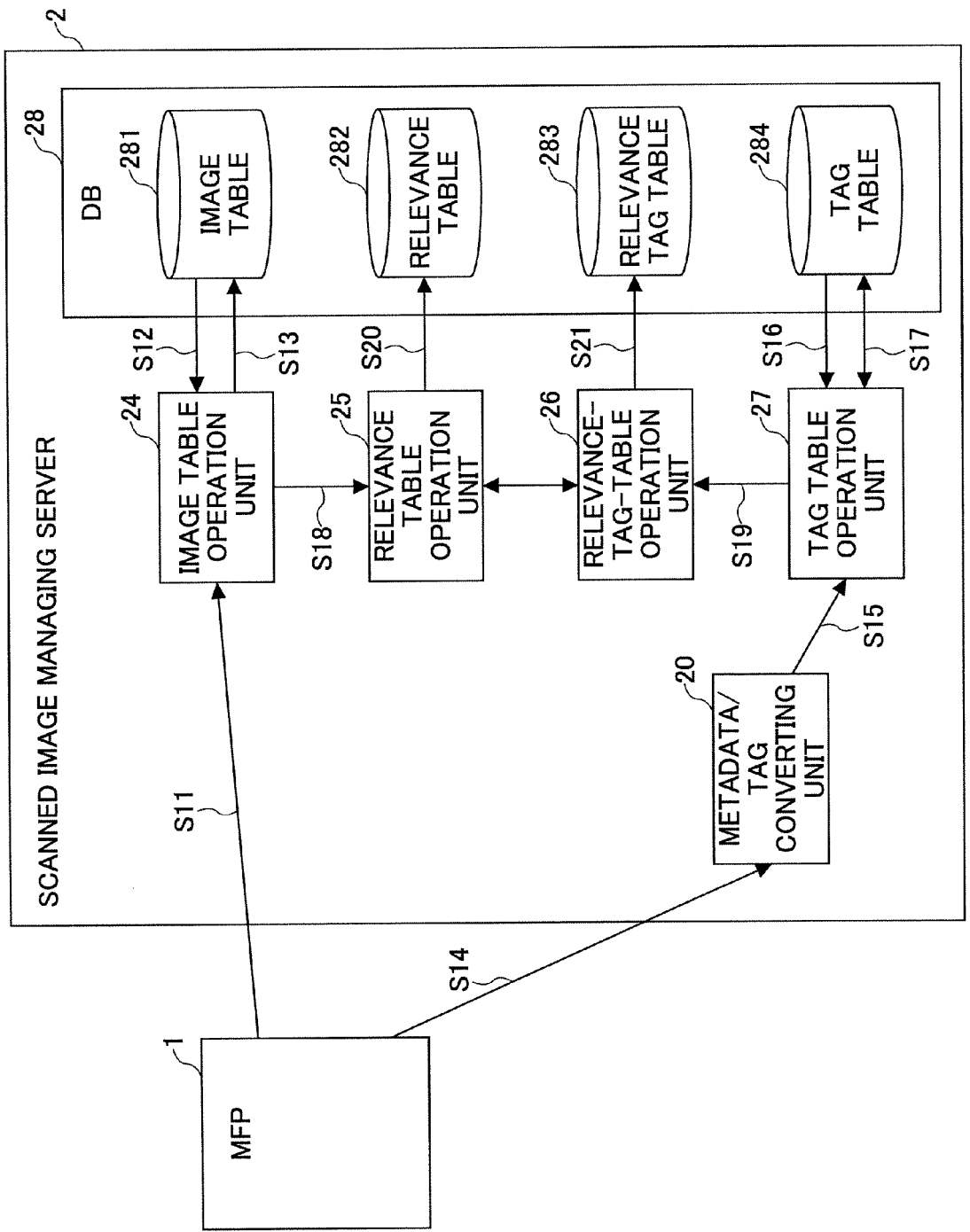
FIG. 15 is a diagram showing the procedure of registration of a scanned image.

Referring back to FIG. 11, scanning of a document is performed on the MFP 1 when the scan button of the area 111b is pressed, so that registration of a scanned image is performed. FIG. 15 is a diagram showing the procedure of registration of a scanned image. In the procedure of FIG. 15, the image table operation unit 24 of the scanned image managing server 2 receives a scanned image from the MFP 1 (step S11). A new ID is acquired by performing the command "select max (id)" with respect to the image table 281 of the database 28, and the new ID is temporarily stored (step S12). The pair of the ID and the scanned image is registered into the image table 281 (step S13).

On the other hand, the metadata/tag converting unit 20 acquires from the MFP 1 the metadata at the time of scanning and the tag (held in the tag buffer) selected on the operation panel 11 (step S14). The metadata/tag converting unit 20 generates a tag from the metadata in accordance with the predetermined criteria, merges it with the tag selected, and transmits the resulting tag to the tag table operation unit 27 (step S15).

An example of the metadata from which a tag is generated is as follows:
(1) the date and time of scanning (e.g., 2005-09-16, 15:00)
(2) quality of image and resolution (e.g., 200 dpi)
(3) color/monochrome distinction (e.g., color)
(4) file type (e.g., JPEG)

Next, the tag table operation unit 27 acquires a new tag ID from the tag table 284 by performing the command "select max (id)" etc., and temporarily stores the new tag ID (step S16) The tag table operation unit 27 checks each of the tags received from the metadata/tag converting unit 20, and, if the temporarily stored tag ID already exists in the tag table 284, discards it. If it does not exist, the tag table operation unit 27 registers the new tag ID into the tag table 284 (step S17).

Then, the relevance table operation unit 25 acquires all the IDs of the registered images from the image table operation unit 24 and acquires the newly registered tag ID from the tag table operation unit 27 (step S18). And the relevance-tag-table operation unit 26 acquires all the IDs of the registered images from the image table operation unit 24 and acquires the newly registered tag ID from the tag table operation unit 27 (step S19).

Next, the relevance table operation unit 25 registers the total combination (direct product) of tag IDs and image IDs into the relevance table 282 (step S20). And the relevance-tag-table operation unit 26 registers the total combination (direct product) of tag IDs and image IDs into the relevance tag table 283 (step S21).

Figure 16:
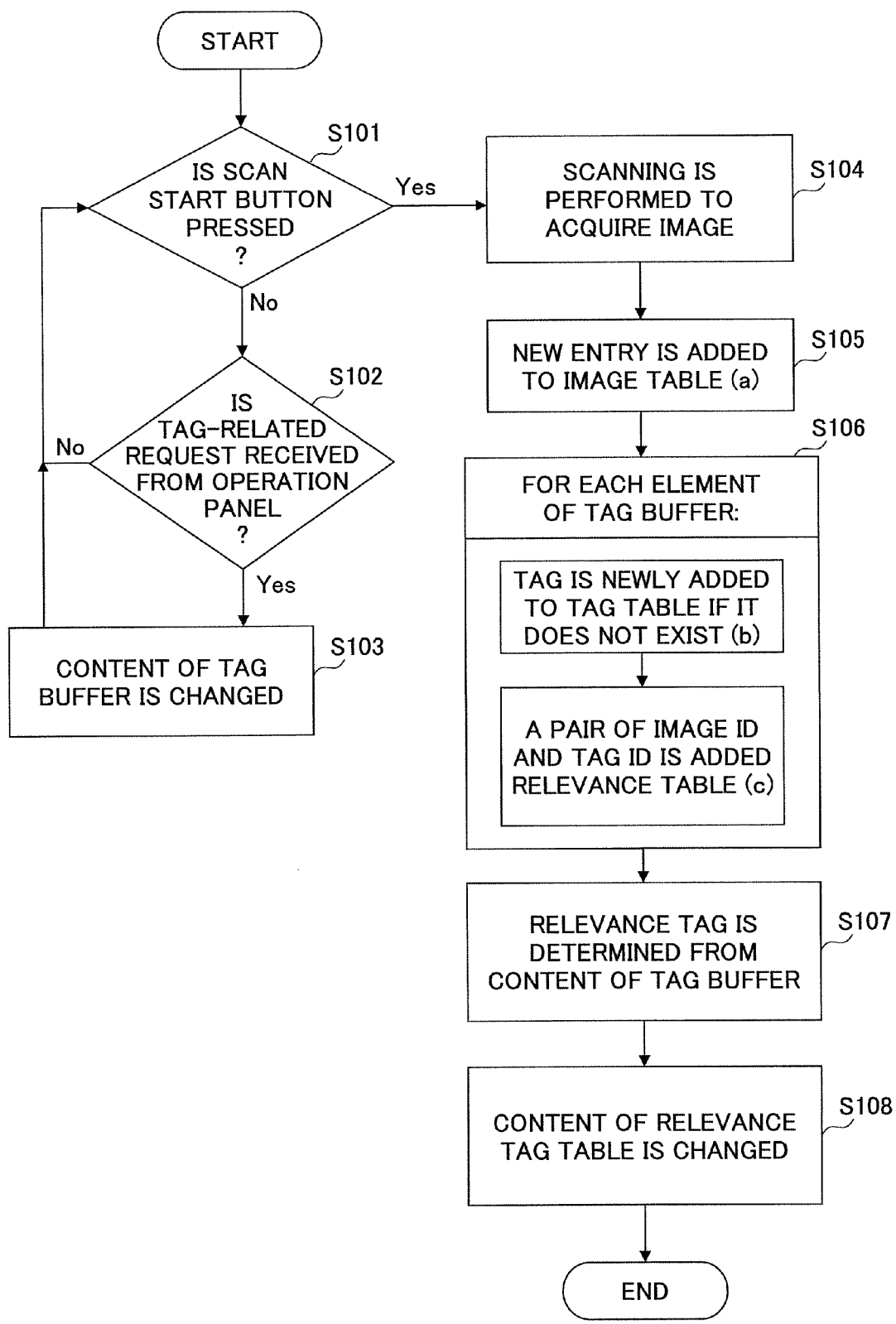
FIG. 16 is a flowchart for explaining the procedure of registration of a scanned image.

FIG. 16 is a flowchart for explaining the procedure of registration of a scanned image.

Upon start of the processing of FIG. 16, it is determined whether the scan start button is pressed (step S101). When the scan start button is not pressed, it is determined whether a tag addition/deletion request is received from the operation panel (step S102). When the request is not received, the control is returned to the determination of step S101 about the scan start button again.

When the tag addition/deletion request is received, the contents of the tag buffer are changed according to the received request (step S103). The control is returned to the determination of step S101 about the scan start button again.

When the scan start button is pressed, scanning of a document is performed and a scanned image is acquired (step S104). A new entry of the scanned image is added to the image table 281 (step S105; (a)). And each element of the tag buffer is checked. If the element does not exist in the tag table 284, the tag ID of the element concerned is newly added to the tag table 284 (step S106; (b)), and the pair of image ID and tag ID is newly added to the relevance table 282 (step S106; (c)).

Subsequently, a relevance tag is determined from the contents of the tag buffer (step S107), and the contents of the relevance tag table 283 are changed (step S108; (d)). And the processing is ended.

Figure 17:
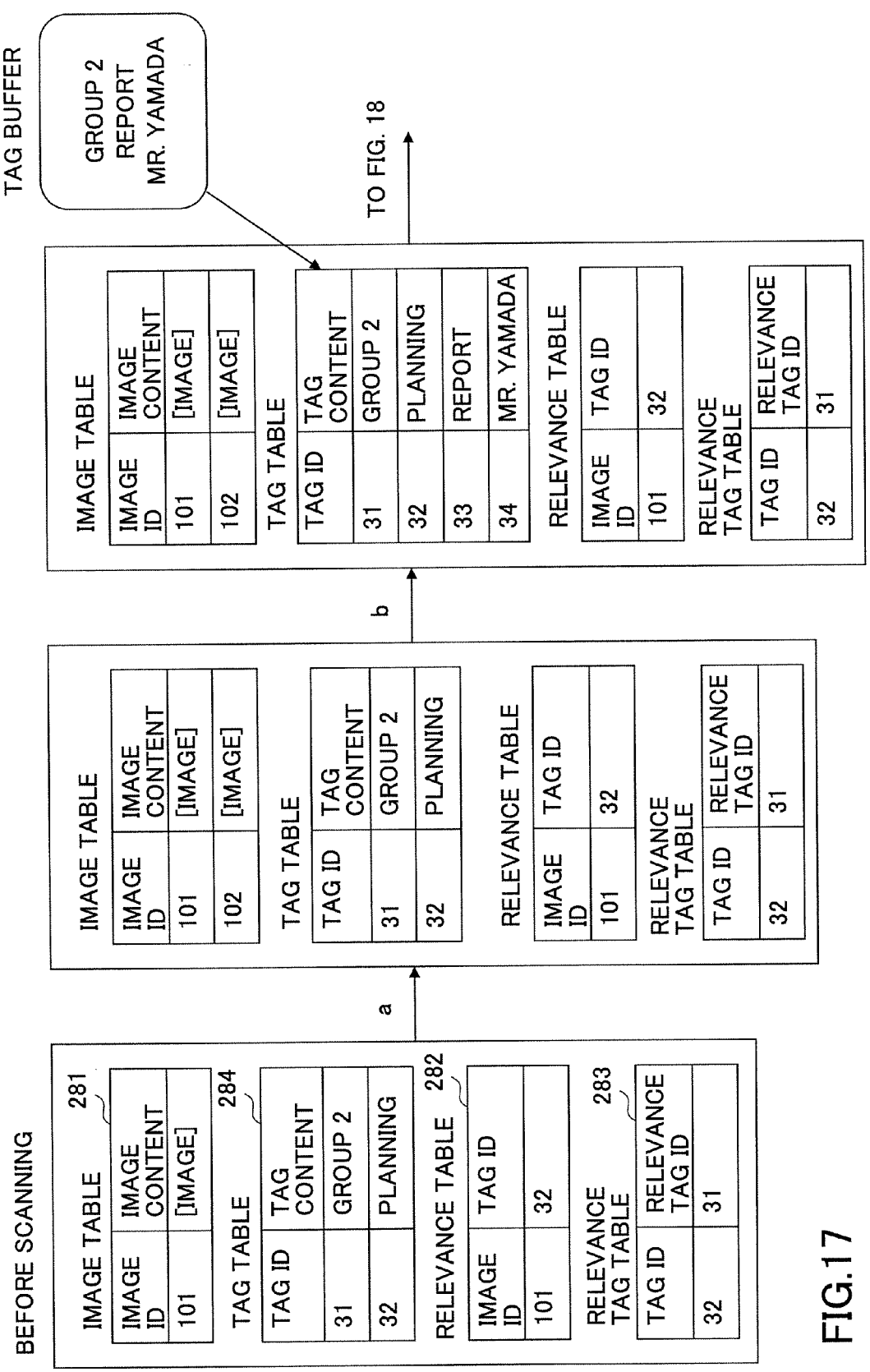
FIG. 17 is a diagram showing the database operation in registration of a scanned image.
Figure 18:
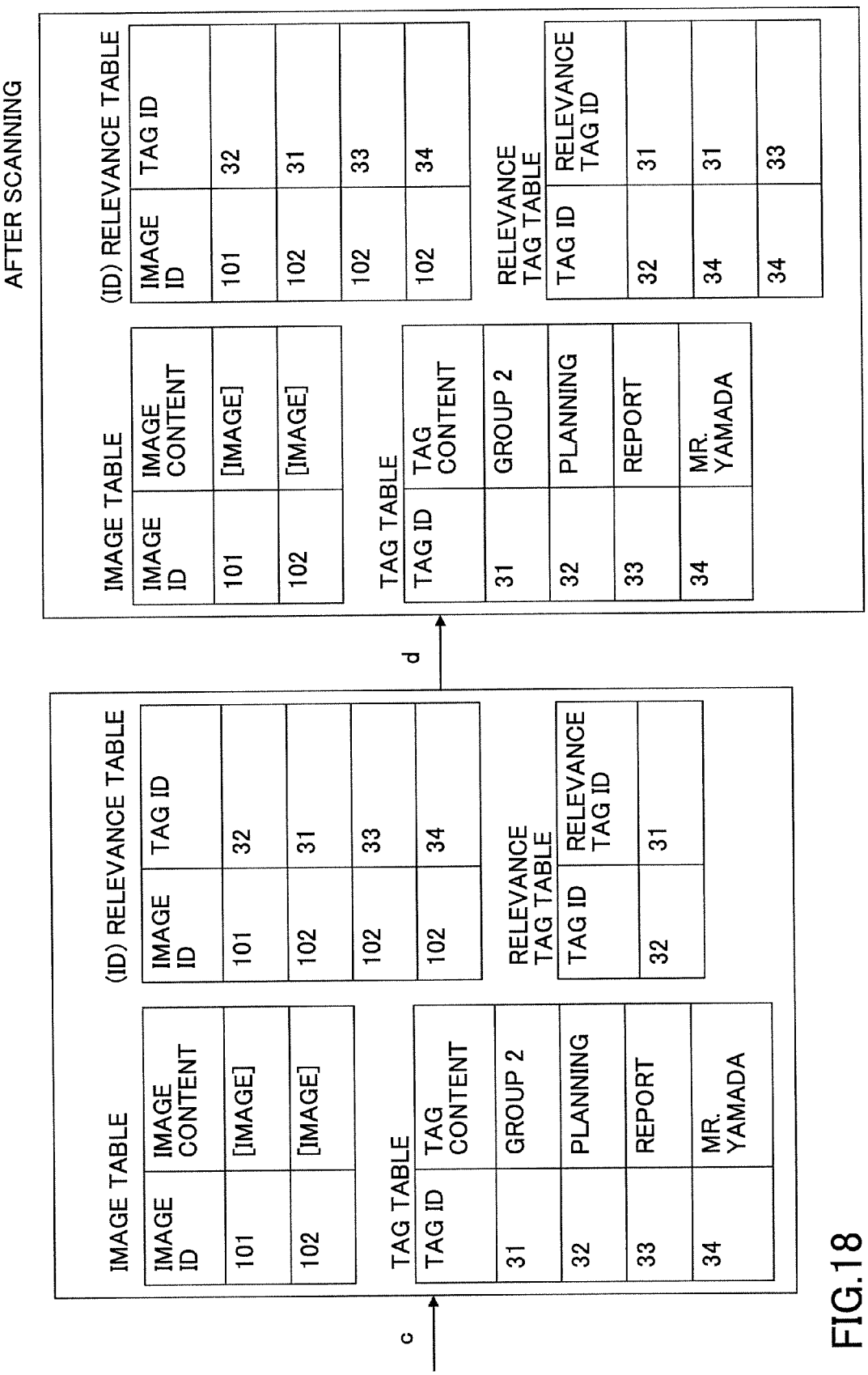
FIG. 18 is a diagram showing the database operation in registration of a scanned image.

FIGS. 17 and 18 are diagrams showing the database operation in registration of a scanned image. The changes of the contents of the database 28 from the state before scanning to the state after scanning are illustrated. In FIGS. 17 and 18, the reference characters a-d which respectively indicate the states corresponding to the states in the flowchart of FIG. 16 indicated by the same reference characters in FIG. 16 are given.

Figure 19:
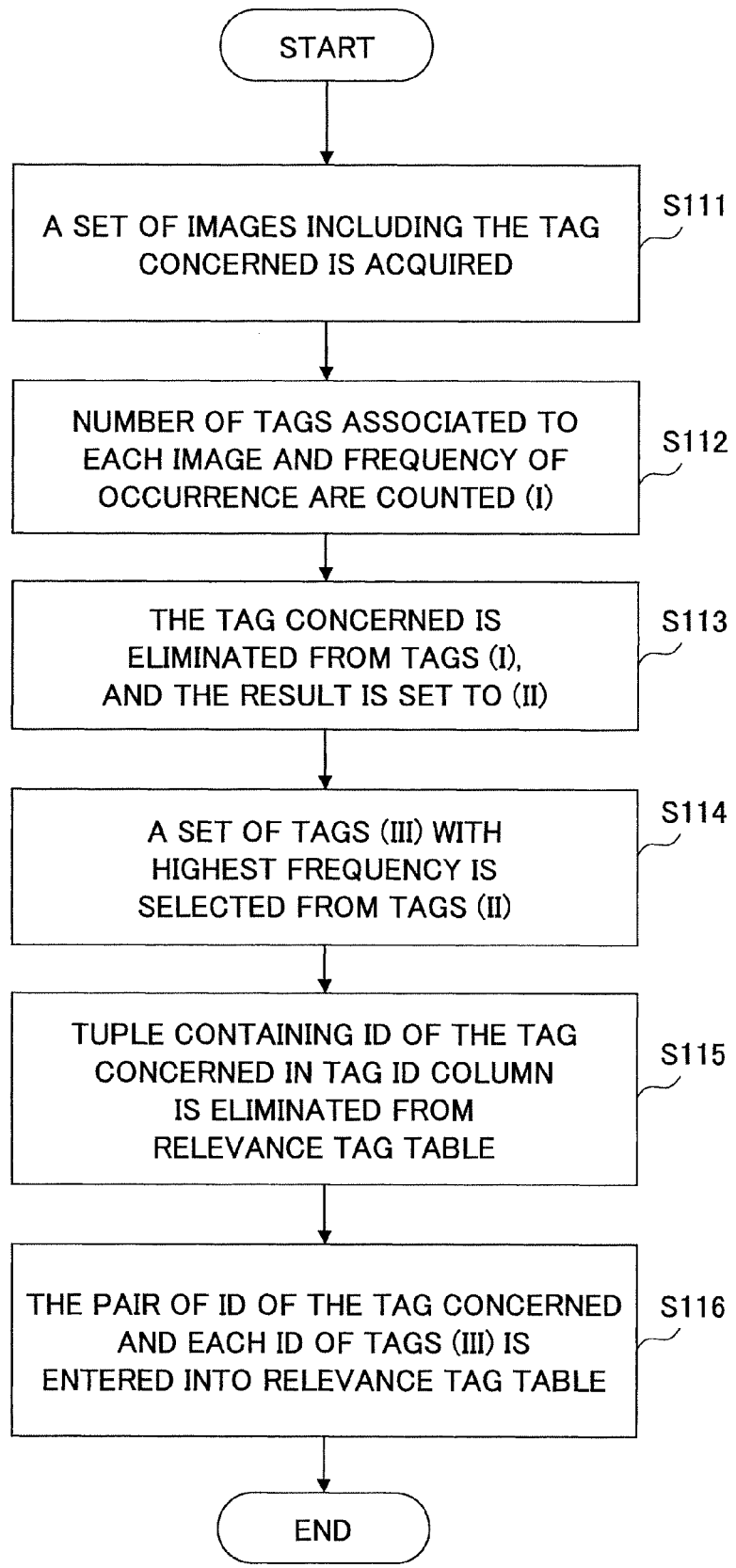
FIG. 19 is a flowchart for explaining the procedure of determination of a relevance tag.

FIG. 19 is a flowchart for explaining the procedure of the determination of the relevance tag of step S107 in the flowchart of FIG. 16.

Upon start of the processing of FIG. 19, a set of images in which the tag concerned is contained is acquired (step S111). And the number of tags associated with each image and the frequency of occurrence are counted (step S112; (I)).

Subsequently, the tag concerned itself is removed from the set of tags (I) (step S113; (II)), and a fixed number of tags with the highest frequency of occurrence are selected from the remaining tags (II) (step S114; (III)).

Subsequently, the tuple containing the ID of the tag concerned in the tag ID column of the relevance tag table 283 is eliminated from the relevance tag table 283 (step S115). The pair of the ID of the tag concerned and each ID of the selected tags (III) is entered into the relevance tag table 283 (step S116). And the processing is ended.

Figure 20:
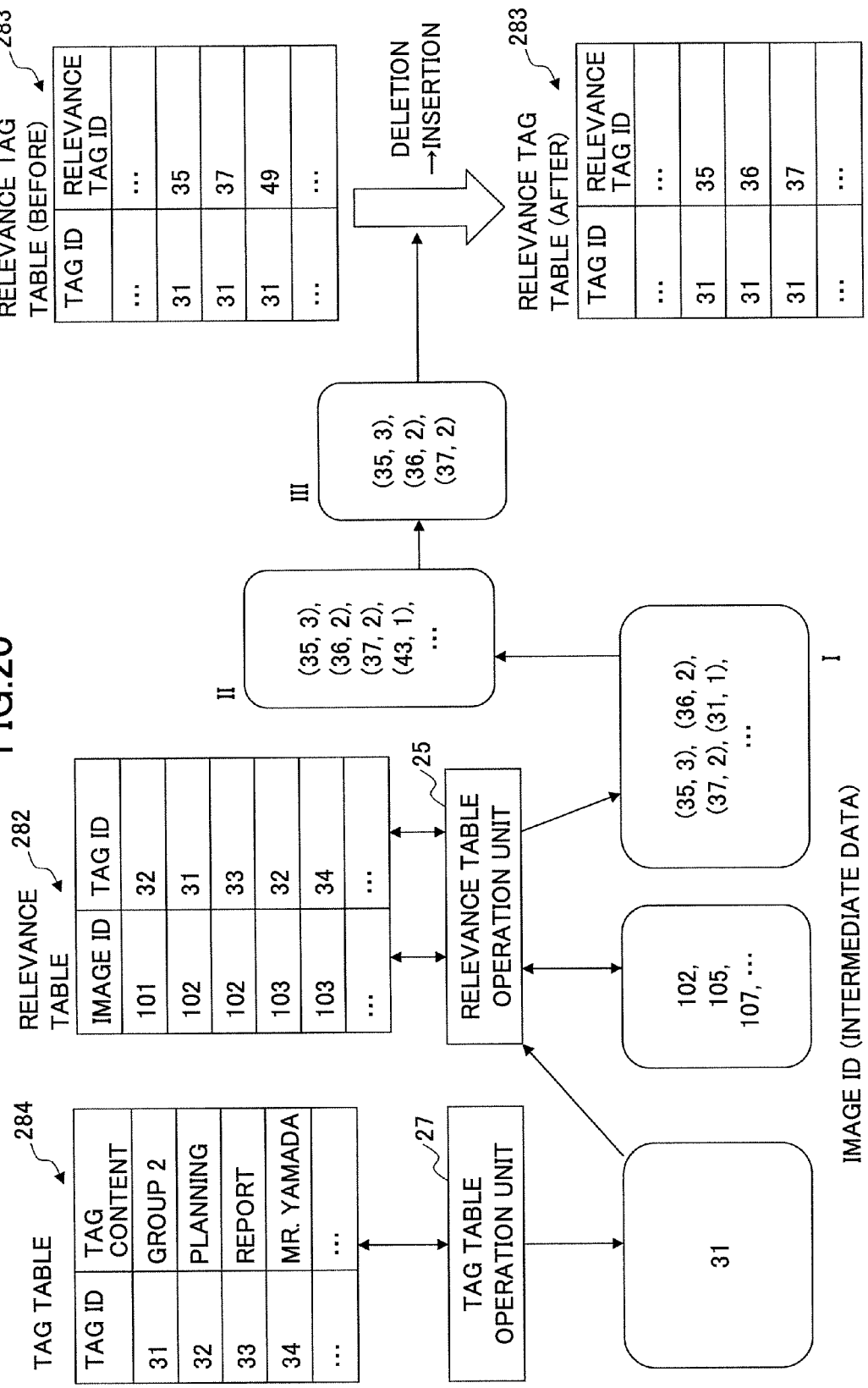
FIG. 20 is a diagram showing the database operation in determination of a relevance tag.

FIG. 20 is a diagram showing the database operation in the determination of a relevance tag. In FIG. 20, the reference characters I-III which respectively indicate the states corresponding to the states in the flowchart of FIG. 19 indicated by the same reference characters in FIG. 19 are given.

Referring back to FIG. 11, when a tag among the set of tags in the area 111d of the screen 111 is pressed, the display screen changes to the tag presentation screen 112. On the other hand, when a thumbnail in the area 111d of the screen 111 is pressed, the display screen changes to the image-presentation/tag-change/printing screen 113.

Figure 21:
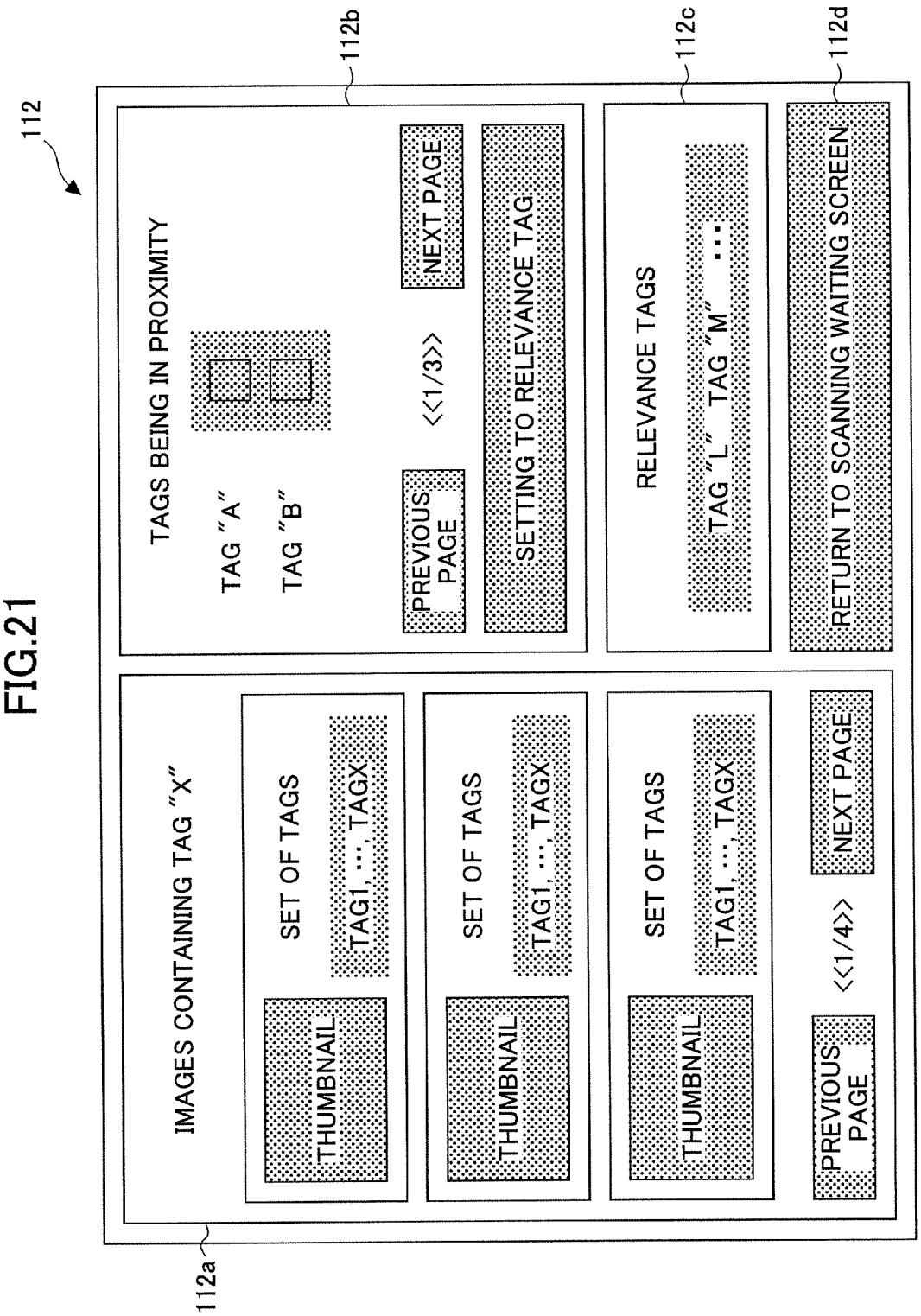
FIG. 21 is a diagram showing an example of a tag presentation screen.

FIG. 21 is a diagram showing an example of the tag presentation screen 112. As shown in FIG. 21, the tag presentation screen 112 comprises an area 112a in which the images containing the tag (X) that is selected in the scanning waiting screen 111 are displayed (the images being displayed in order of the time of updating), an area 112b in which tags (proximity tags) in proximity of the selected tag (X) are displayed (the tags being displayed in order of similarity) and they can be set up to relevance tags, an area 112c in which the set-up relevance tags are displayed, and an area 112d in which the return button for returning to the scanning waiting screen is displayed.

Figures 22, 23:
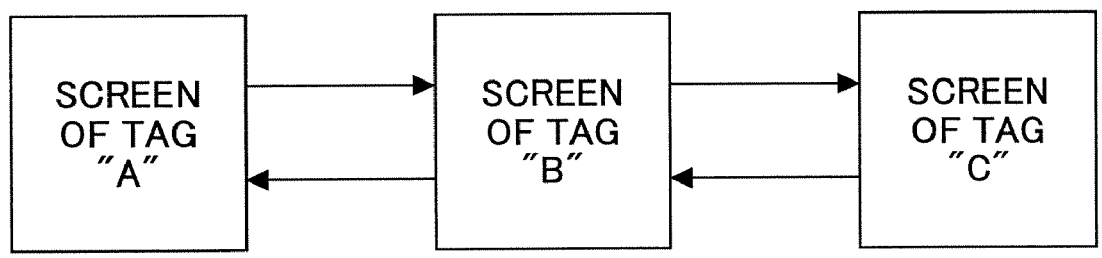
FIG. 22 is a diagram showing an example of an SQL command to get a set of proximity tags from a selected tag.
FIG. 23 is a diagram for explaining an example of the screen transition when a tag character string is pressed.

FIG. 22 is a diagram showing an example of an SQL command to get a set of proximity tags from a selected tag, which is used in displaying the proximity tags in the area 112b of the tag presentation screen 112.

In the example of FIG. 22, the selected tag is set to the search word, and a set of tag IDs, the tag character string of which matches the search word, are collected from the tag table (tagTable) 284, and a set of proximity tags (A) are extracted from the collected tags. In addition, the tags with a high degree of similarity of the file common to that of the tag concerned may be set to tags with a high degree of proximity.

Referring back to FIG. 21, when any of the check boxes close to the proximity tags A and B displayed in the area 112b is selected by the user, the selected one can be set to the relevance tag by pressing the lower "setting to relevance tag" key. The set-up relevance tag is displayed on the area 112c of the tag presentation screen 112.

When the return button for returning to the scanning waiting screen of the area 112d is pressed, the display screen returns to the scanning waiting screen 111.

FIG. 23 is a diagram for explaining an example of the screen transition when a tag character string in the area 112b or the area 112a of FIG. 21 is pressed. As shown in FIG. 23, when the character string of tag "B" in the screen of tag "A" is pressed, the display screen changes to the screen of tag "B". When the character string of tag "C" in the screen of tag "B" is pressed, the display screen changes to the screen of tag "C". The reversed processing is also possible. Thereby, the user is allowed to change the display screen directly to a desired tag presentation screen 112 by one click.

Figure 24:
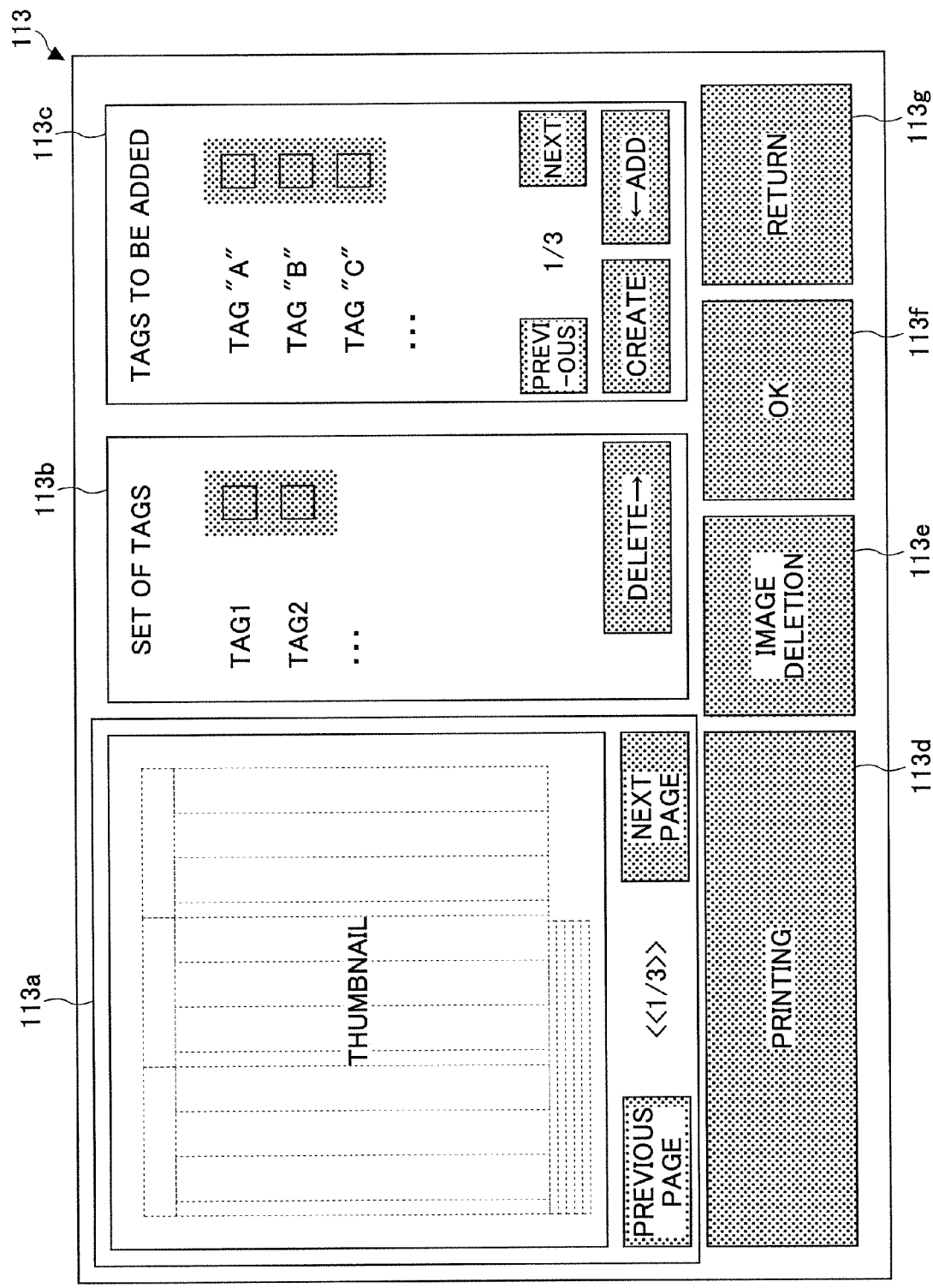
FIG. 24 is a diagram showing an example of an image presentation/tag change/printing screen.

FIG. 24 is a diagram showing an example of the image-presentation/tag-change/printing screen 113. As shown in FIG. 24, the image-presentation/tag-change/printing screen 113 comprises an area 113a in which a thumbnail of the image selected is displayed, an area 113b in which a set of the set-up tags is displayed, an area 113c in which a set of the tags to be added is displayed, an area 113d in which the print button is displayed, an area 113e in which the image deletion button is displayed, an area 113f in which the OK button is displayed, and an area 113g in which the return button is displayed. Turning over of the page of the thumbnail of the selected image in the area 113a according to the sequence of the images in the screen 112 is also possible.

In order to delete a tag in the screen 113 of FIG. 24, the check box on the right side of the corresponding tag in the area 113b is selected and the deletion button is pressed. The actual deletion of the tag is performed after the OK button in the area 113f is pressed.

In order to add a tag in the screen 113 of FIG. 24, the check box on the right side of a tag displayed in the area 113c or a tag newly added by the addition button is selected and the addition button is pressed. The actual addition of the tag is performed after the OK button in the area 113f is pressed.

Figure 25:
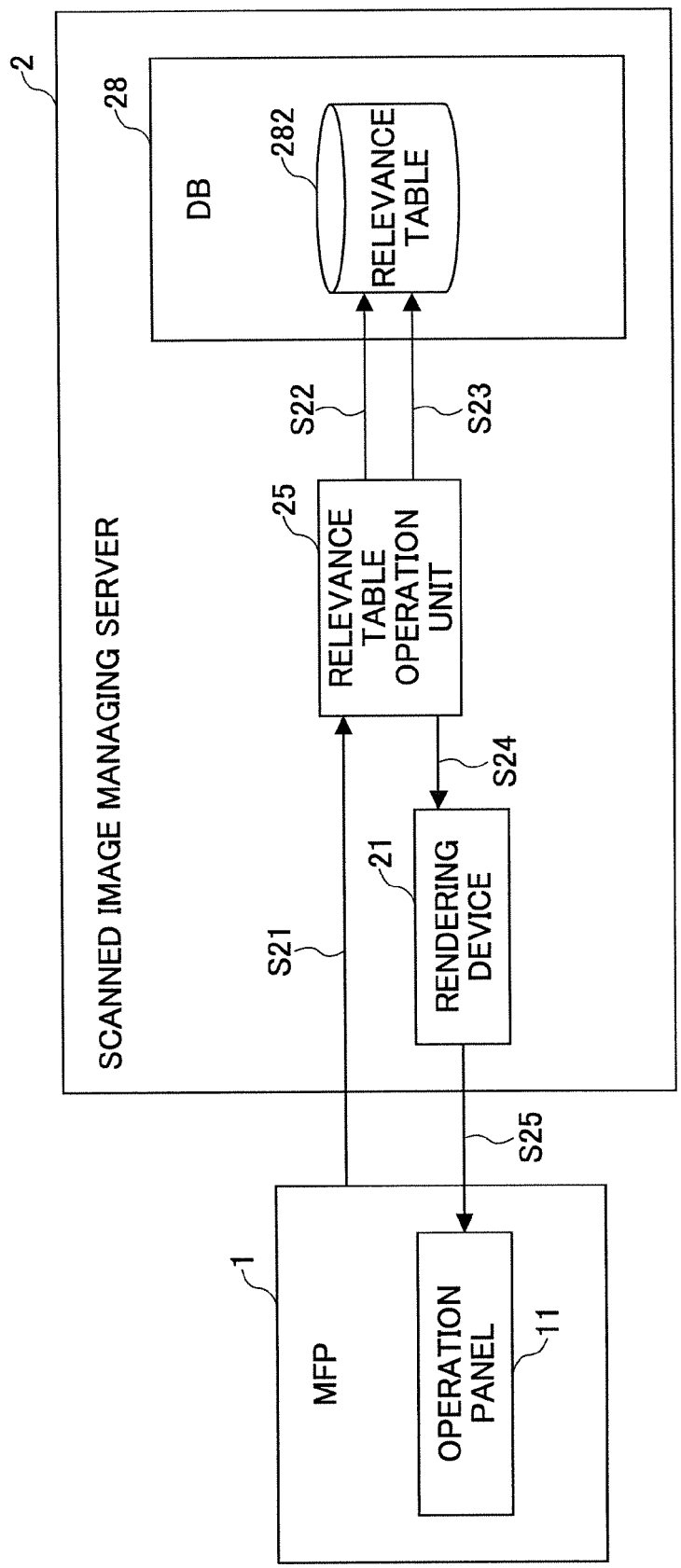
FIG. 25 is a diagram showing the procedure of tag change when an OK button is pressed after deletion/addition of a tag.

FIG. 25 is a diagram showing the procedure of tag change when the OK button is pressed after deletion/addition of a tag.

As shown in FIG. 25, the relevance table operation unit 25 of the scanned image managing server 2 receives an image ID and a set of tag IDs to be deleted or added from the MFP 1 (step S21). The relevance table operation unit 25 deletes or adds the tuple, corresponding to the received tag ID, in the relevance table 282 of the database 28 (step S22).

The relevance table operation unit 25 makes a combination of the image ID and each of the received tag IDs into the tuple and registers it in the relevance table 282 (step S23). The relevance table operation unit 25 transfers the set of tags after the tag deletion/addition to the rendering device 21 (step S24). And the rendering device 21 creates again a new image-presentation/tag-change/printing screen 113 according to the received tag set (step S25).

Figure 26:
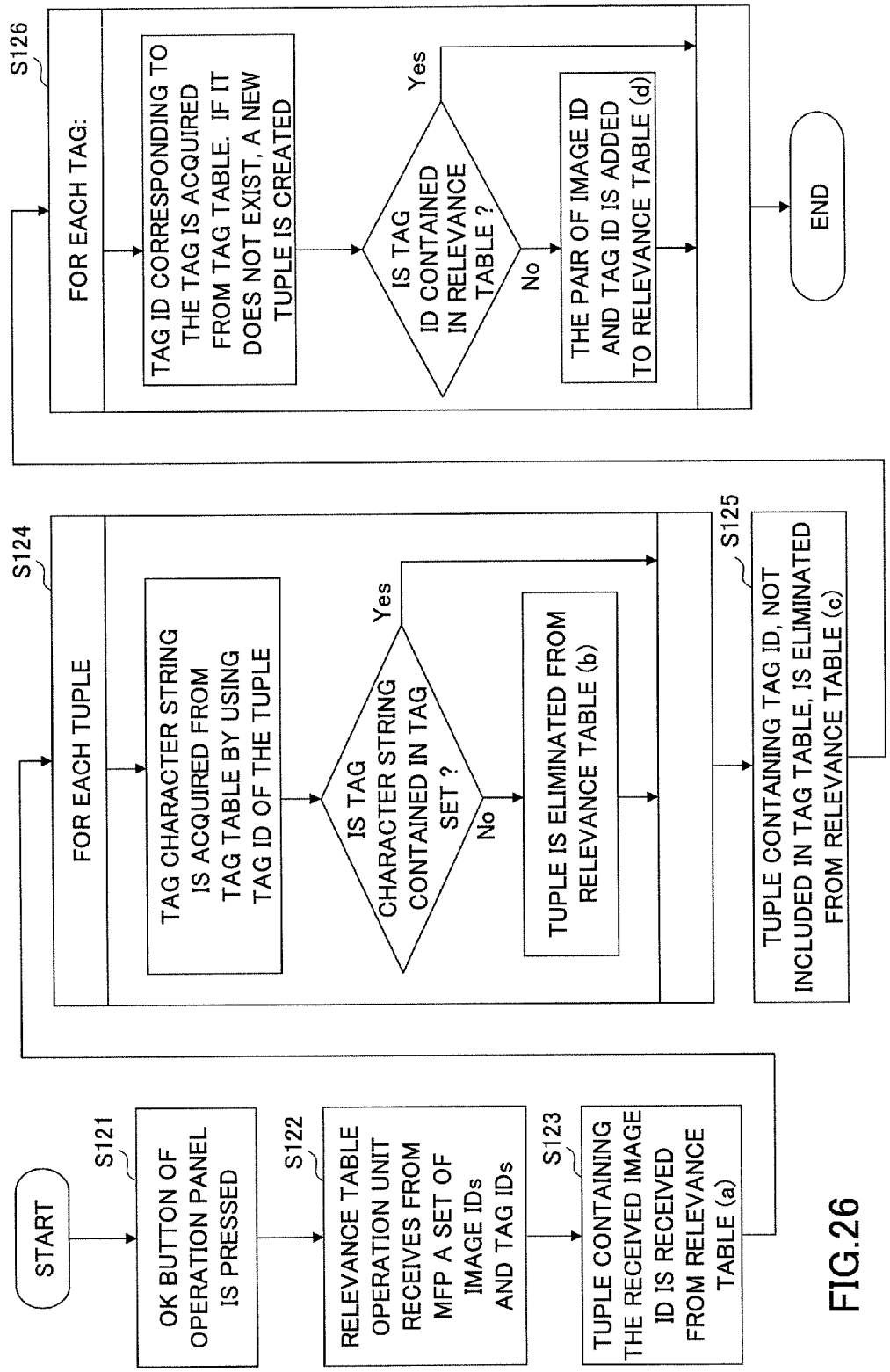
FIG. 26 is a flowchart for explaining the procedure of tag change.

FIG. 26 is a flowchart for explaining the procedure of tag change.

Upon start of the processing of FIG. 26, the "OK" button of the operation panel is pressed (step S121). Then the relevance table operation unit 25 receives an image ID and a set of tags from the MFP 1 (step S122) and acquires the tuple containing the received image ID from the relevance table 282 (step S123; (a)).

Subsequently, the relevance table operation unit 25 checks each tuple acquired. Namely, a tag character string is acquired from the tag table 284 by using the tag ID of the tuple and it is determined whether the acquired tag character string is contained in the set of tags. When it is not contained, the tuple is deleted from the relevance table 282 (step S124; (b)).

Subsequently, the tuple having the tag ID which is not contained in the tag table 284 is deleted from the relevance table 282 (step S125; (c)). A tag ID corresponding to each of the received tags is acquired from the tag table 284, and when the tag ID does not exist, a new tuple is created. And it is determined whether the tag ID concerned is contained in the relevance table 282. When it is not contained, the pair of image ID and tag ID is added to the relevance table 282 (step S126; (d)). And the processing is ended.

Figure 27:
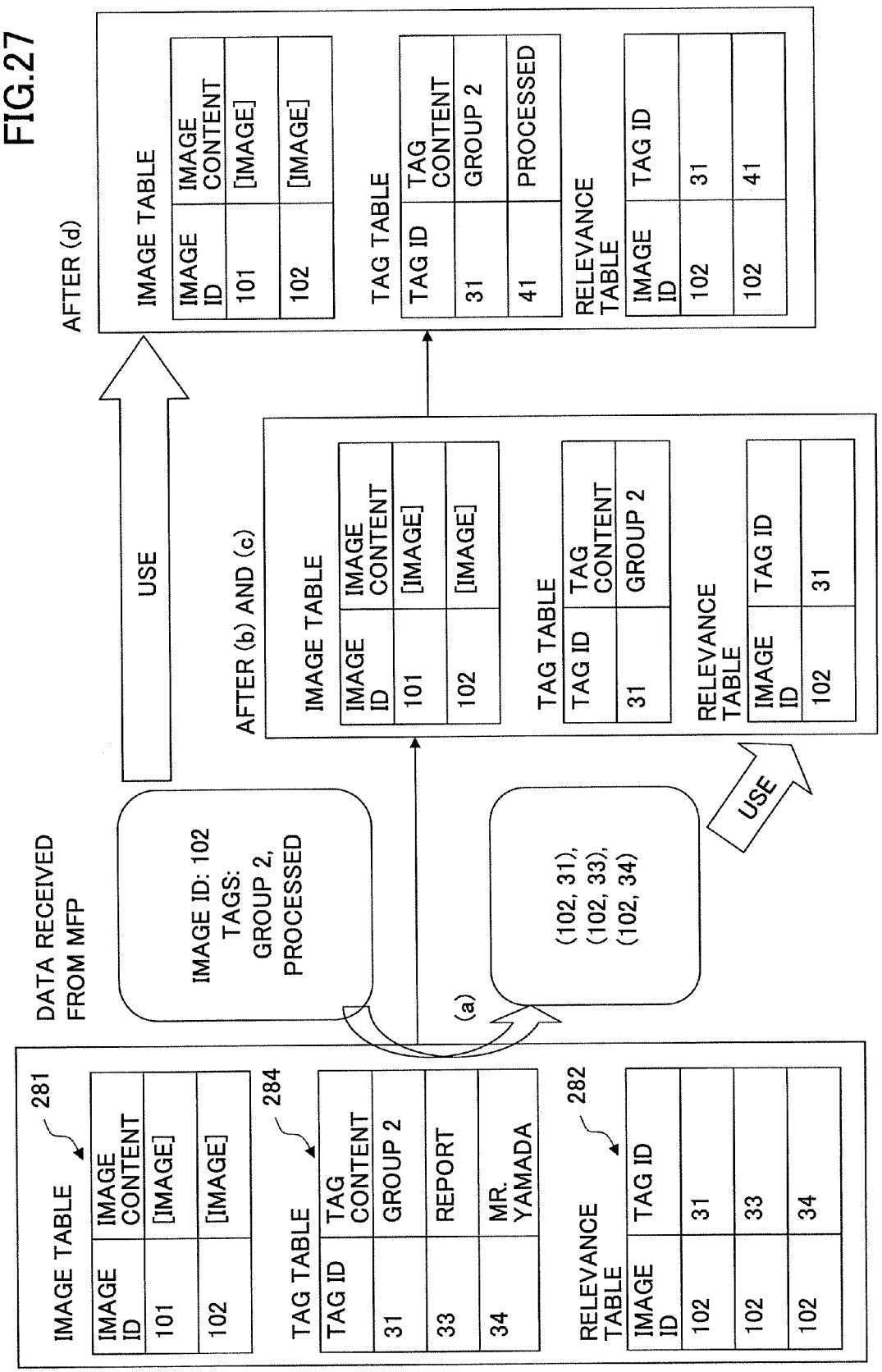
FIG. 27 is a diagram showing the database operation in tag change.

FIG. 27 is a diagram showing the database operation in tag change. In FIG. 27, the reference characters (a)-(d) which respectively indicate the states corresponding to the states indicated by the same reference characters in the flowchart of FIG. 26 are given.

Figure 28:
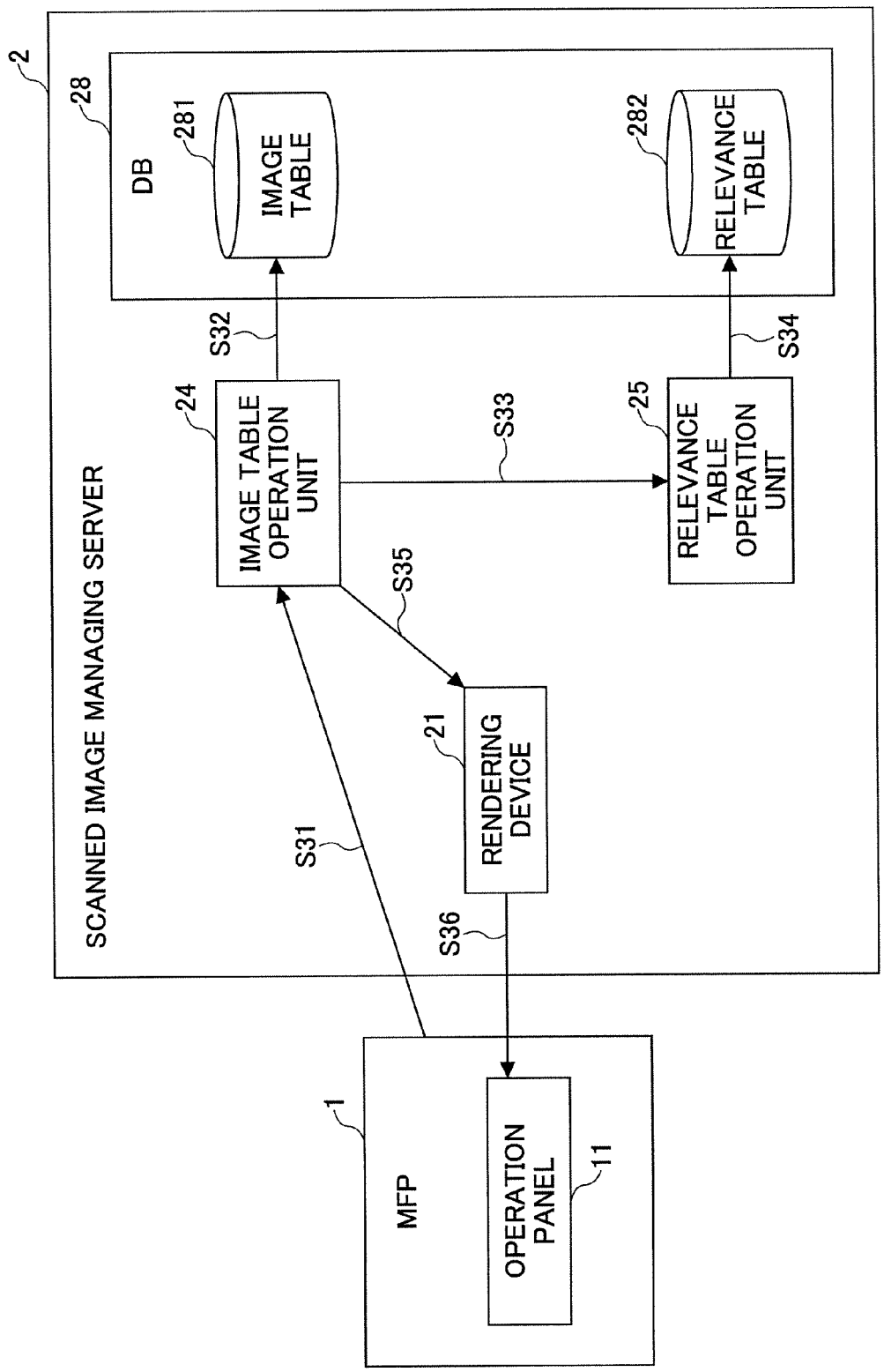
FIG. 28 is a diagram showing the procedure of image deletion when an image deletion button is pressed.

FIG. 28 is a diagram showing the procedure of image deletion when the image deletion button is pressed.

As shown in FIG. 28, the image table operation unit 24 of the scanned image managing server 2 receives an image ID from the MFP 1 (step S31). Then, the image table operation unit 24 deletes the tuple containing the image ID from the image table 281 of the database 28 (step S32) and transfers the deleted image ID to the relevance table operation unit 25 (step S33)

The relevance table operation unit 25 deletes the tuple associated with the received image ID from the relevance table 282 (step S34) The tag table 284 remains unchanged.

On the other hand, the image table operation unit 24 notifies the image deletion to the rendering device 21 (step S35). Then, the rendering device 21 performs the screen transition to the scanning waiting screen 111 (step S36).

Figure 29:
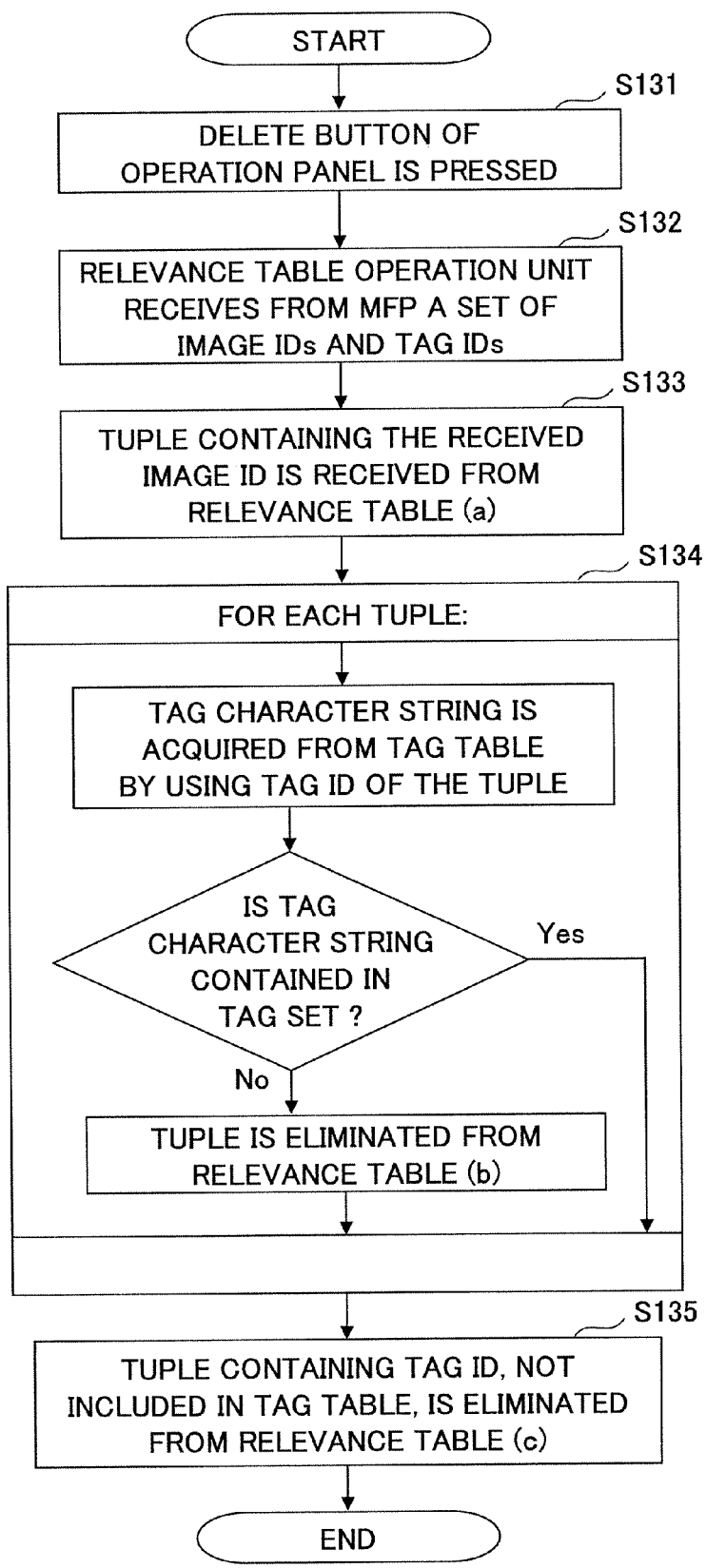
FIG. 29 is a flowchart for explaining the procedure of image deletion.

FIG. 29 is a flowchart for explaining the procedure of image deletion.

Upon start of the processing of FIG. 29, the "image deletion" button of the operation panel is pressed (step S131). Then, the relevance table operation unit 25 receives the image ID from the MFP 1 (step S132) and acquires the tuple containing the received image ID from the relevance table 282 (step S133; (a)).

Subsequently, the relevance table operation unit 25 each tuple. Namely, a tag character string is acquired from the tag table 284 by using the tag ID of the tuple, and it is determined whether the tag character string is contained in the set of tags. When it is not contained, the tuple is deleted from the relevance table 282 (step S134; (b)).

And the tuple having the tag ID which is not contained in the tag table 284 is deleted from the relevance table 282 (step S135; (c)). And the processing is ended.

Figure 30:
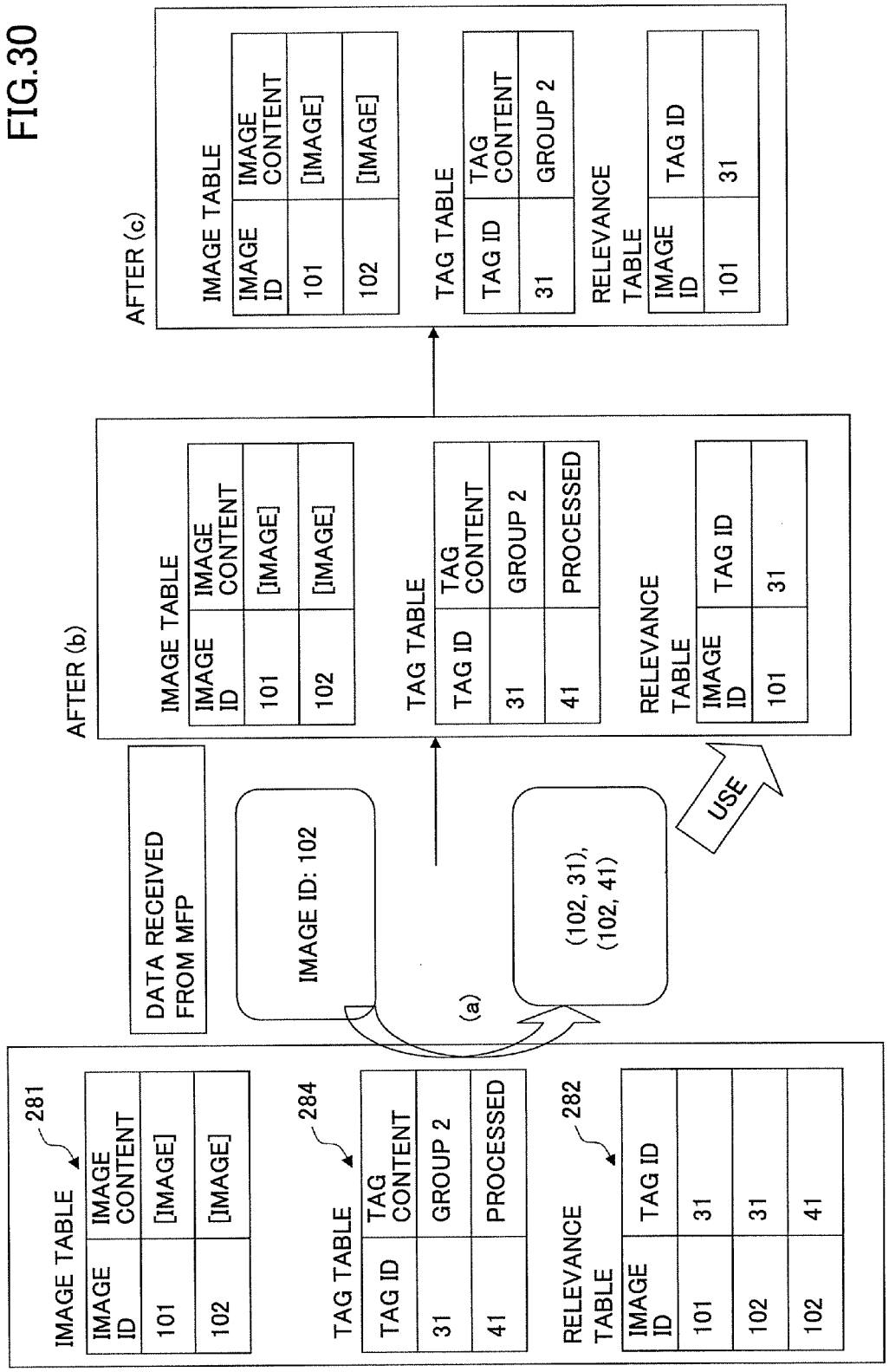
FIG. 30 is a diagram showing the database operation in image deletion.

FIG. 30 is a diagram showing the database operation in image deletion. In FIG. 30, the reference characters (a)-(c) which respectively indicate the states corresponding to the states indicated by the same reference characters in the flowchart of FIG. 29 are given.

Figure 31:
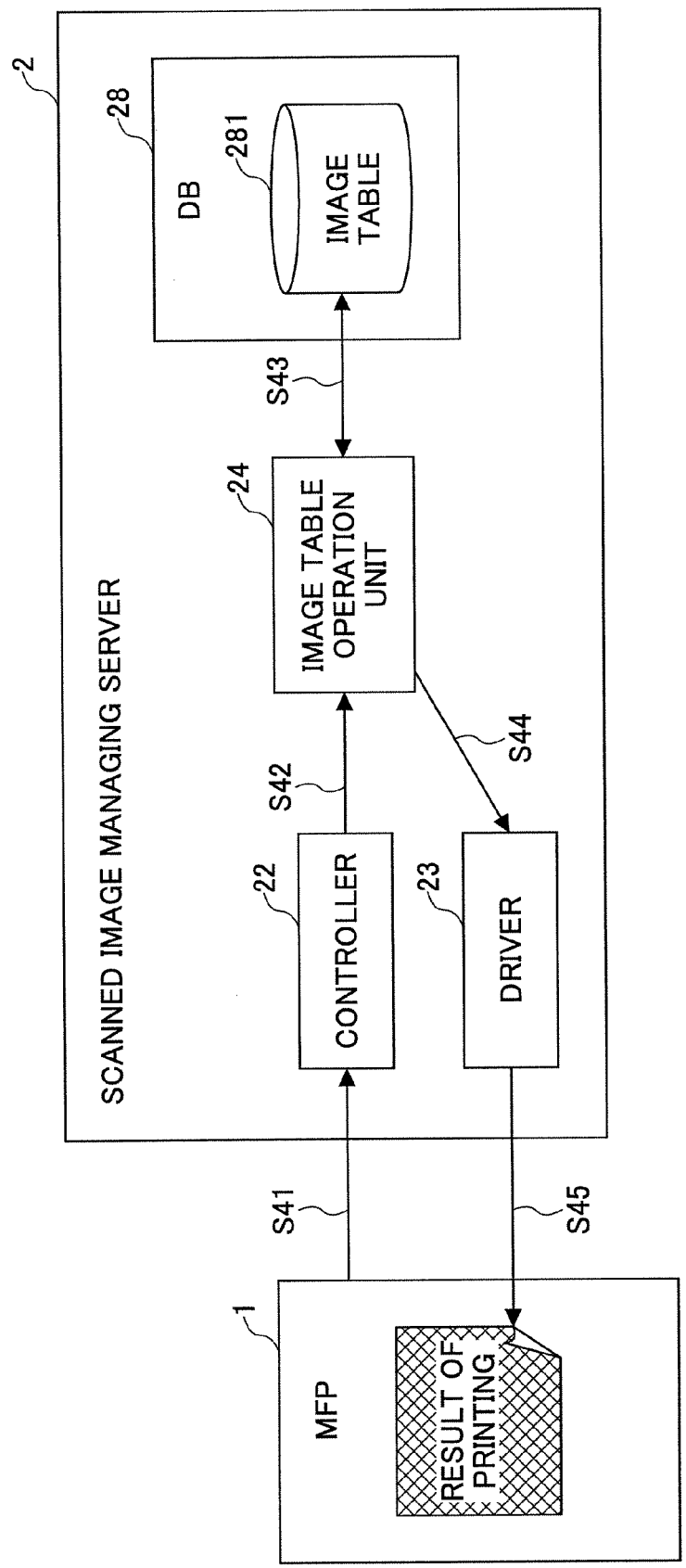
FIG. 31 is a diagram showing the procedure of printing when a print button is pressed.
Figure 32:
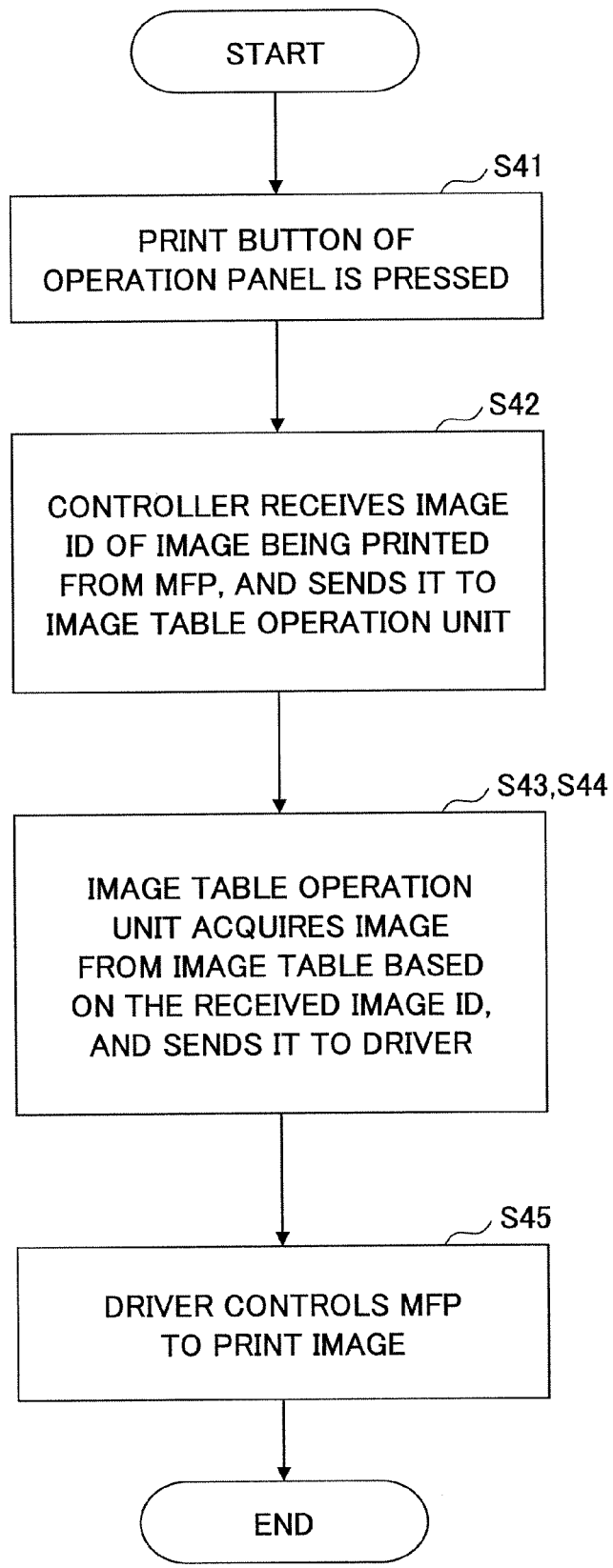
FIG. 32 is a flowchart for explaining the procedure of printing.

FIG. 31 is a diagram showing the procedure of printing when the print button is pressed, and FIG. 32 is a flowchart for explaining the procedure of printing.

As shown in FIGS. 31 and 32, the controller 22 of the scanned image managing server 2 receives a printing command from the MFP 1 (step S41). Then, the controller 22 sends a request for acquisition of the image concerned to the image table operation unit 24 (step S42).

The image table operation unit 24 acquires the image data from the image table 281 of the database 28 (step S43) and transmits the image data to the driver 23 (step S44). And the driver 23 causes the MFP 1 to perform printing of the image (step S45).

Figure 33:
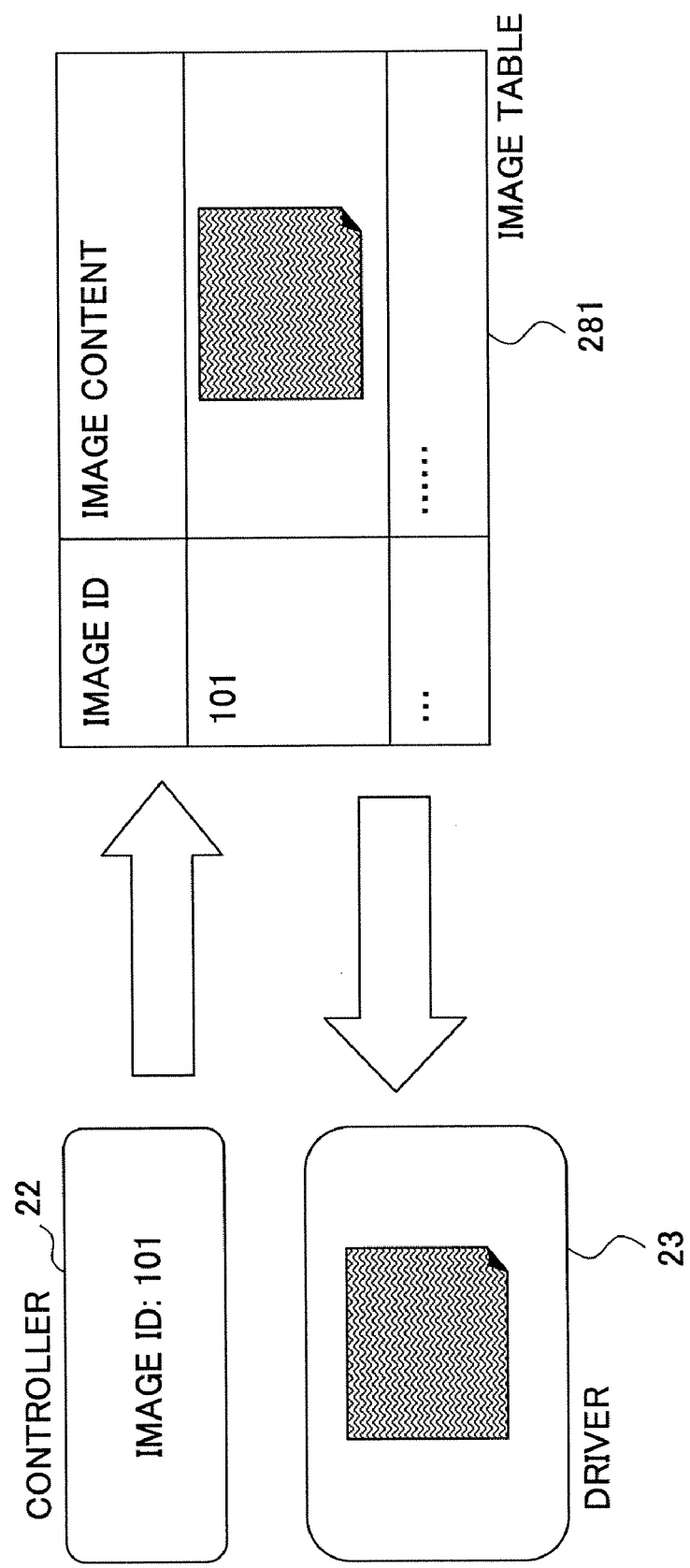
FIG. 33 is a diagram showing the database operation in printing.

FIG. 33 is a diagram showing the database operation in printing. The flow of image ID and image data transmitted between the controller 22, the image table 281, and the driver 23 is illustrated in FIG. 33.

Figure 34:
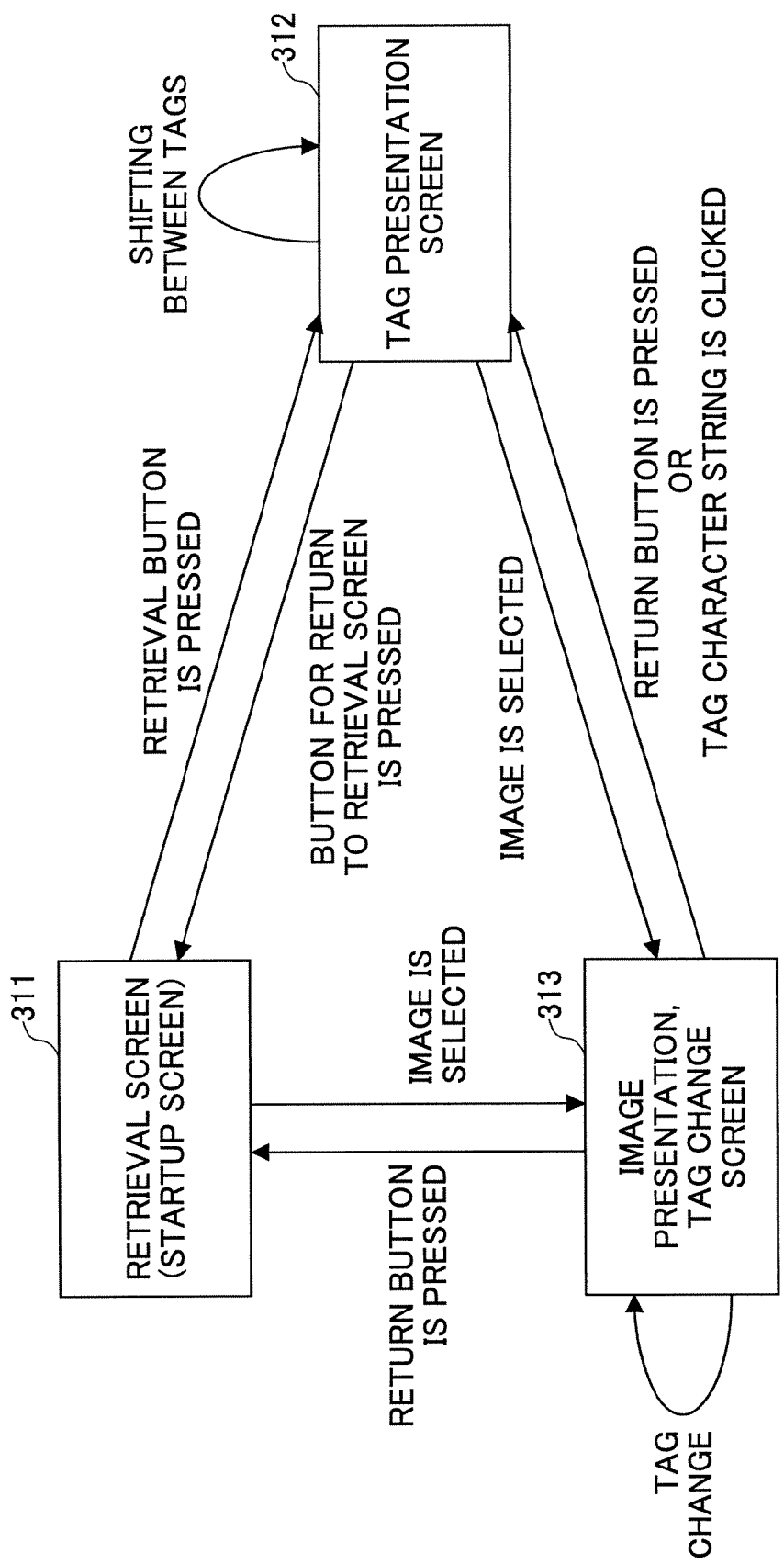
FIG. 34 is a diagram showing an example of the screen transition of a display screen.

Next, operation of the PC 3 will be explained. FIG. 34 is a diagram for explaining an example of the screen transition of the display screen 31 of the PC 3. As shown in FIG. 34, the display screen 31 of the PC 3 changes in a cyclic manner between a retrieval screen 311 which is a startup screen, a tag presentation screen 312 for performing setting of relevance tags, and an image-presentation/tag-change screen 313 for performing image checking and tag changing.

That is, the display screen 31 changes to the tag presentation screen 312 by clicking the retrieval button in the retrieval screen 311. It returns back to the retrieval screen 311 by clicking the return button in the tag presentation screen 312. The display screen 31 changes to the image-presentation/tag-change screen 313 by selecting an image in the retrieval screen 311. It returns back to the retrieval screen 311 by clicking the return button. The display screen 31 changes to the image-presentation/tag-change screen 313 by choosing an image in the tag presentation screen 312. It returns back to the tag presentation screen 312 by clicking the return button.

Figure 35:
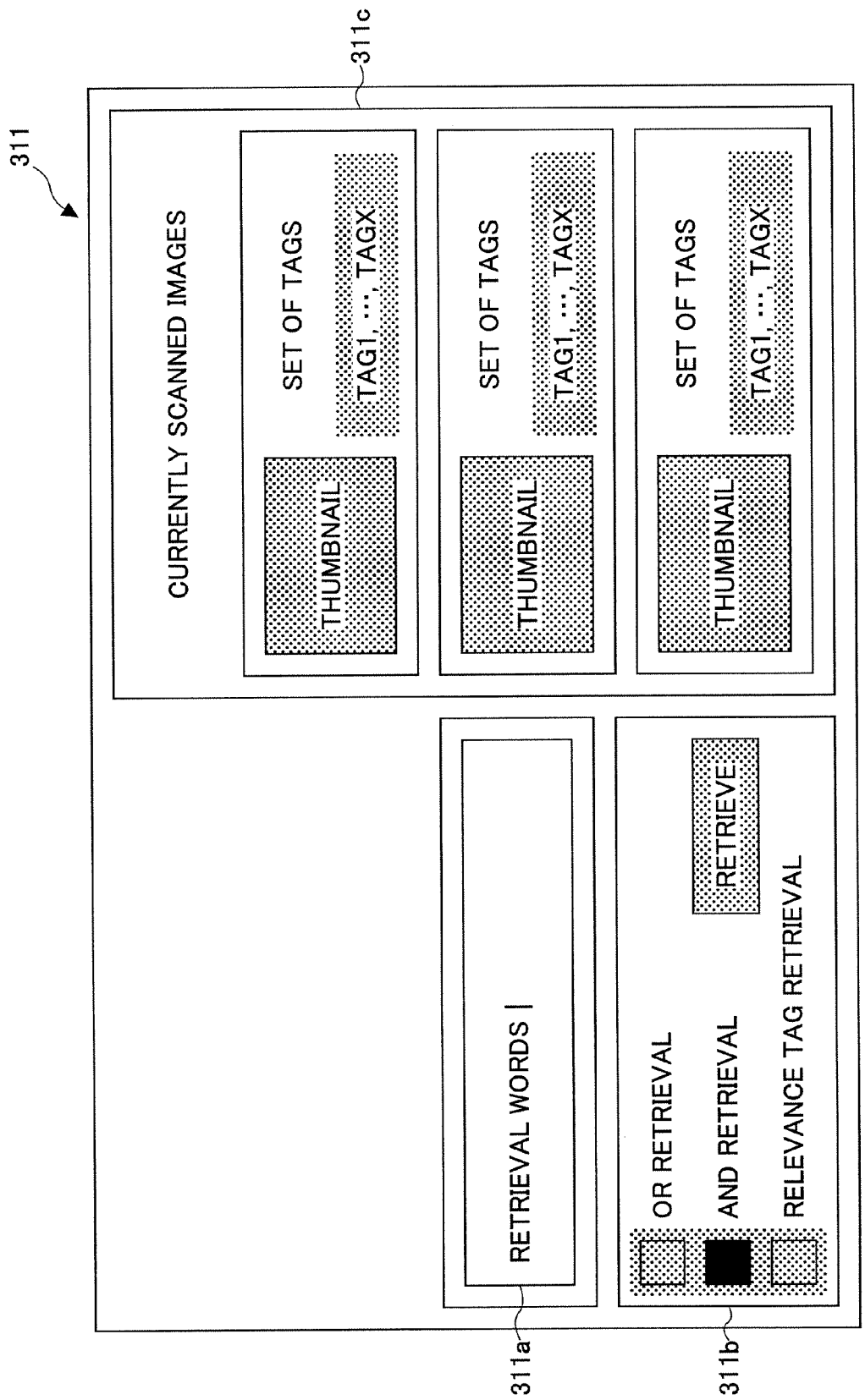
FIG. 35 is a diagram showing an example of a retrieval screen.

FIG. 35 is a diagram showing an example of the retrieval screen 311. As shown in FIG. 35, the retrieval screen 311 comprises an area 311a in which a retrieval frame for inputting retrieval words from the keyboard of the PC 3 is provided, an area 311b in which selection of a retrieval method and a request for starting execution of retrieval are inputted, and an area 311c in which a thumbnail and a set of tags for each of currently scanned images are displayed.

Figure 36:
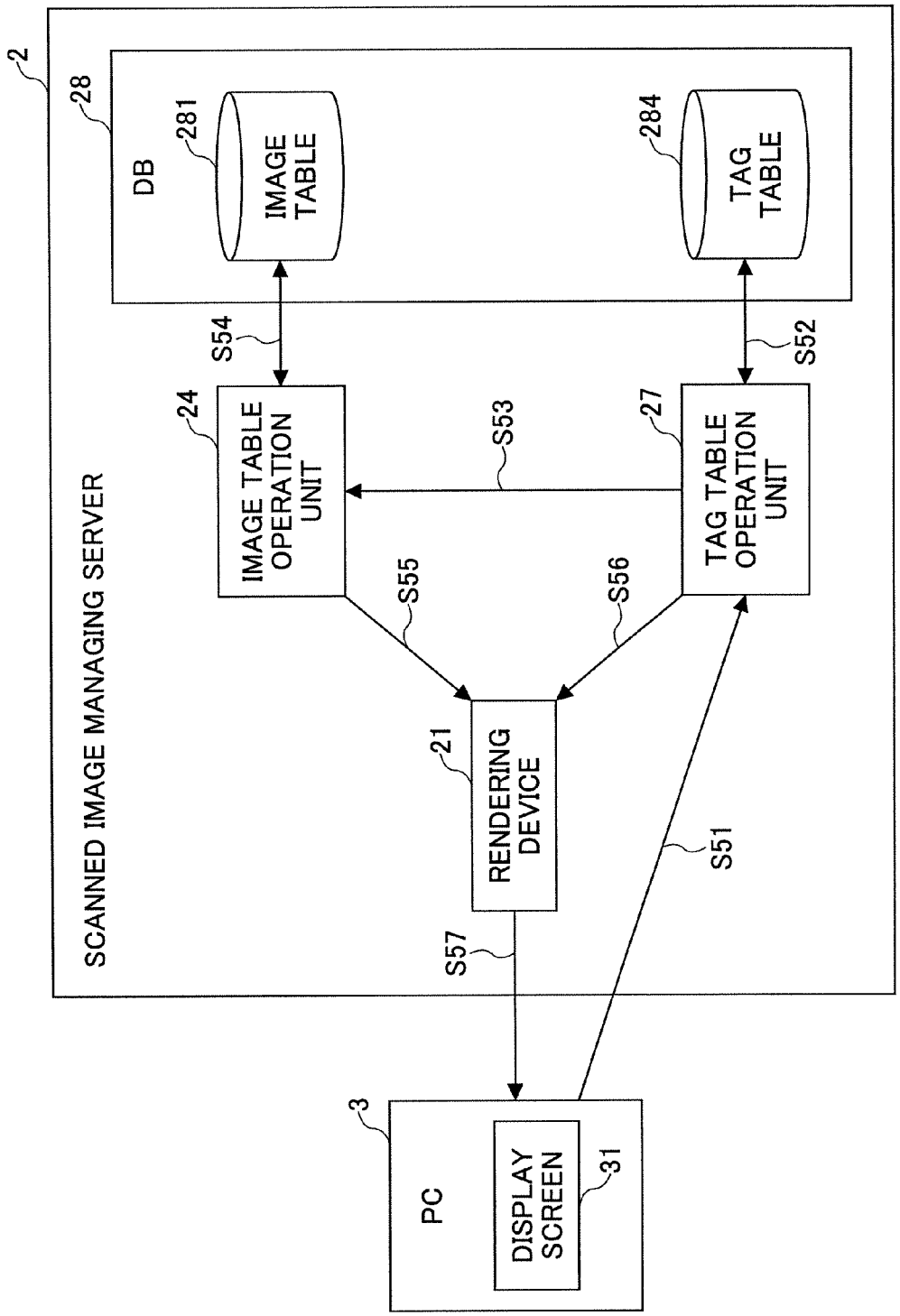
FIG. 36 is a diagram showing the procedure of retrieving a target scanned image by tags.

FIG. 36 is a diagram showing the procedure of retrieving a target scanned image by tags.

As shown in FIG. 36, the tag table operation unit 27 of the scanned image managing server 2 acquires the retrieval word and retrieval condition from the PC 3 (step S51), and acquires a set of tags which match the retrieval word from the tag table 284 of the database 28 (step S52). And the set of tags is transferred to the image table operation unit 24 (step S53).

The image table operation unit 24 acquires an image from the image table 281 based on each of the received tags (step S54) and transfers it to the rendering device 21 (step S55).

The rendering device 21 acquires a set of tags from the tag table operation unit 27 (step S56), creates a screen based on the set of tags received, and causes the PC 3 to display the created screen (step S57).

Figure 37:
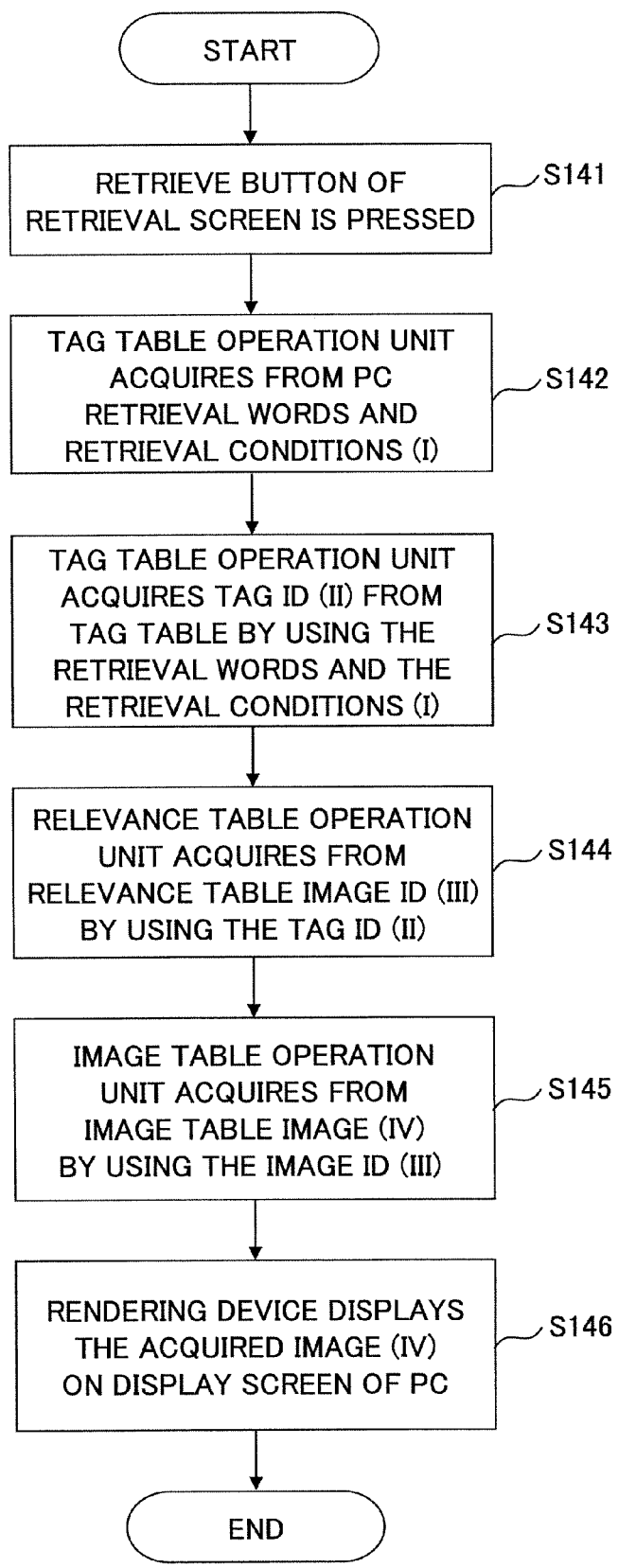
FIG. 37 is a flowchart for explaining the procedure of retrieving a target scanned image by tags.

FIG. 37 is a flowchart for explaining the procedure of retrieving a target scanned image by tags.

Upon start of the processing of FIG. 37, the "retrieve" button in the retrieval screen is pressed (step S141). The tag table operation unit 27 acquires the retrieval word and retrieval condition (I) from the PC 3 (step S142). And the tag table operation unit 27 acquires a tag ID (II) from the tag table 284 by using the retrieval word and retrieval condition (I) (step S143).

The relevance table operation unit 25 acquire an image ID (III) from the relevance table 282 by using the tag ID (II) (step S144), and the image table operation unit 24 acquires a target scanned image (IV) from the image table 281 by using the image ID (III) (step S145). And the rendering device 21 displays the acquired image (IV) on the display screen 31 of the PC 3 (step S146). And the processing is ended.

Figure 38:
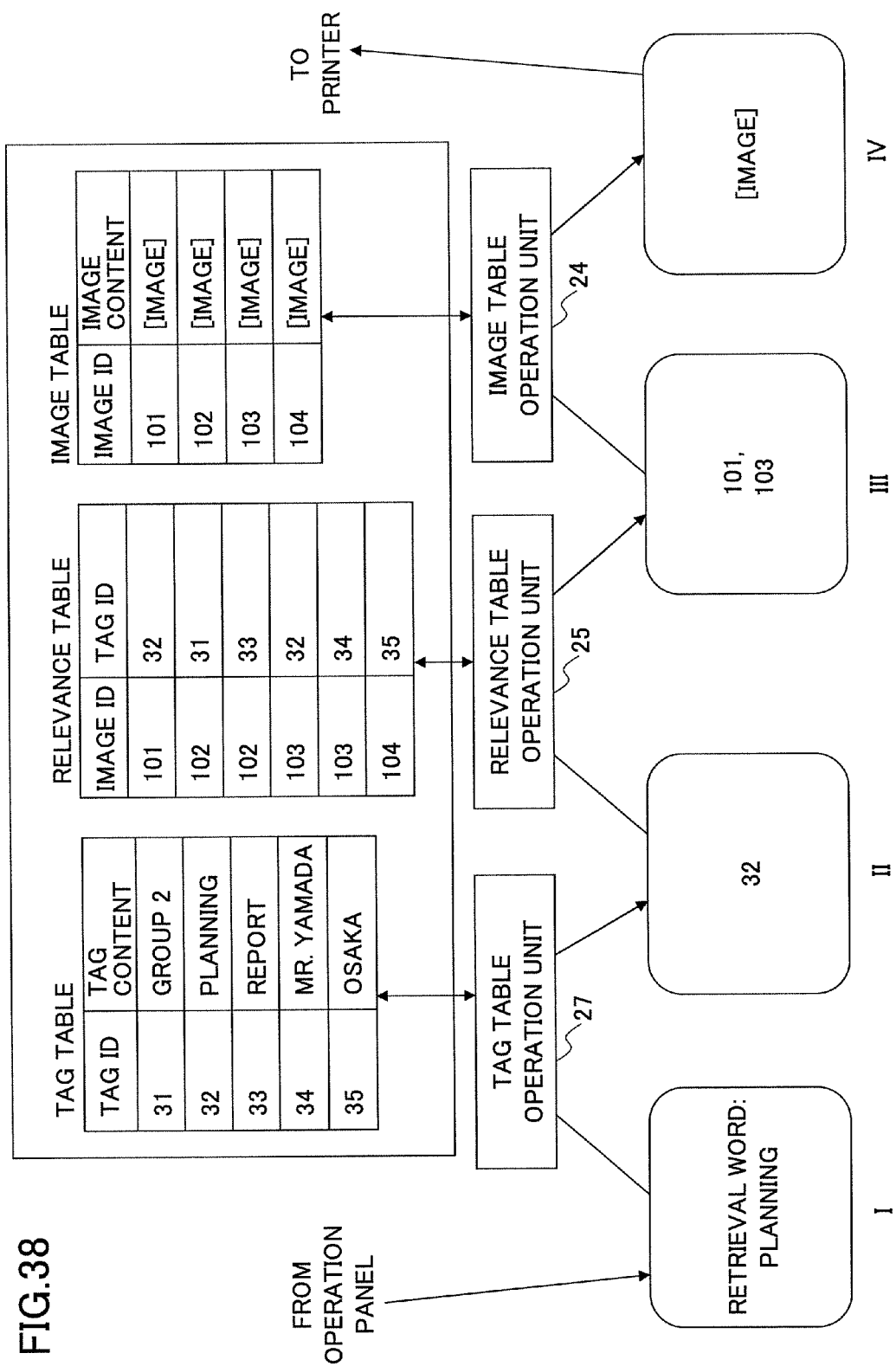
FIG. 38 is a diagram showing the database operation in the retrieving using tags.

FIG. 38 is a diagram showing the database operation in the retrieving using tags. In FIG. 38, the reference characters I-IV which respectively indicate the states corresponding to the states in the flowchart of FIG. 37 indicated by the same reference characters in FIG. 37 are given.

Figure 39:
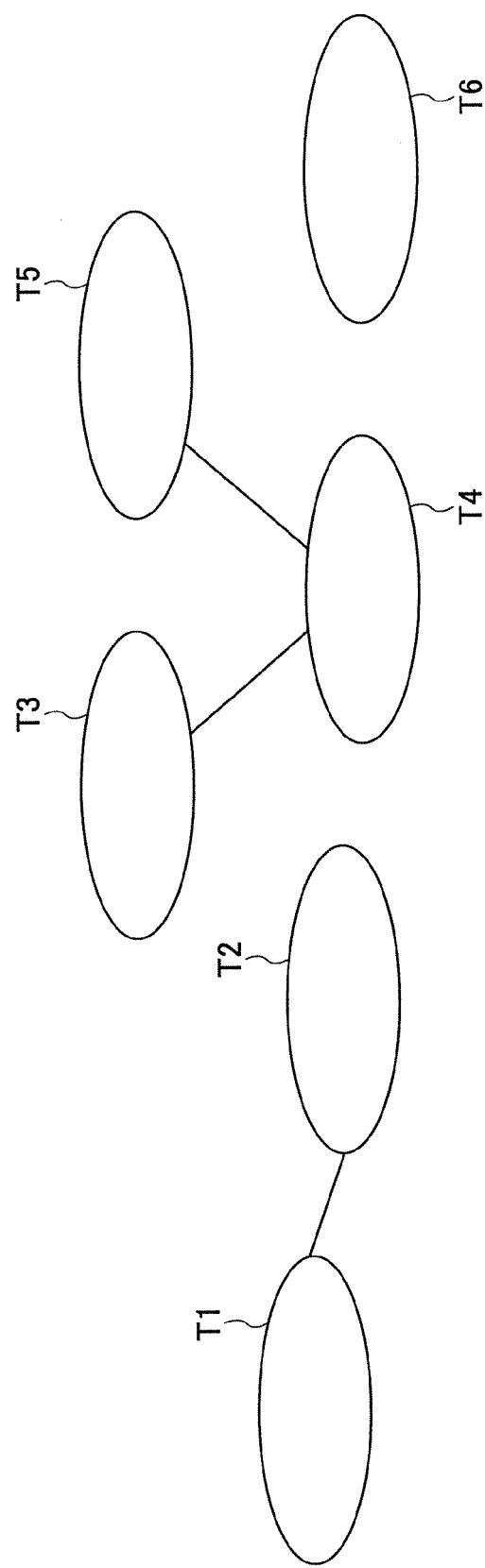
FIG. 39 is a diagram showing an example of the relation of the tags in the relevance tag searching.

FIGS. 39-42 show the retrieving using relevance tags. FIG. 39 is a diagram showing an example of the relation of the tags in the relevance tag searching. As shown in FIG. 39, some of the tags are linked together and the retrieval condition may be extended by using the relation of such linked tags. Specifically, in the example of FIG. 39, the relevance tag T2 which is associated with the tag T1 may be included in the retrieval condition, or the tags T3, T4, and T5 which are linked together may be included in the retrieval condition.

Figure 40:
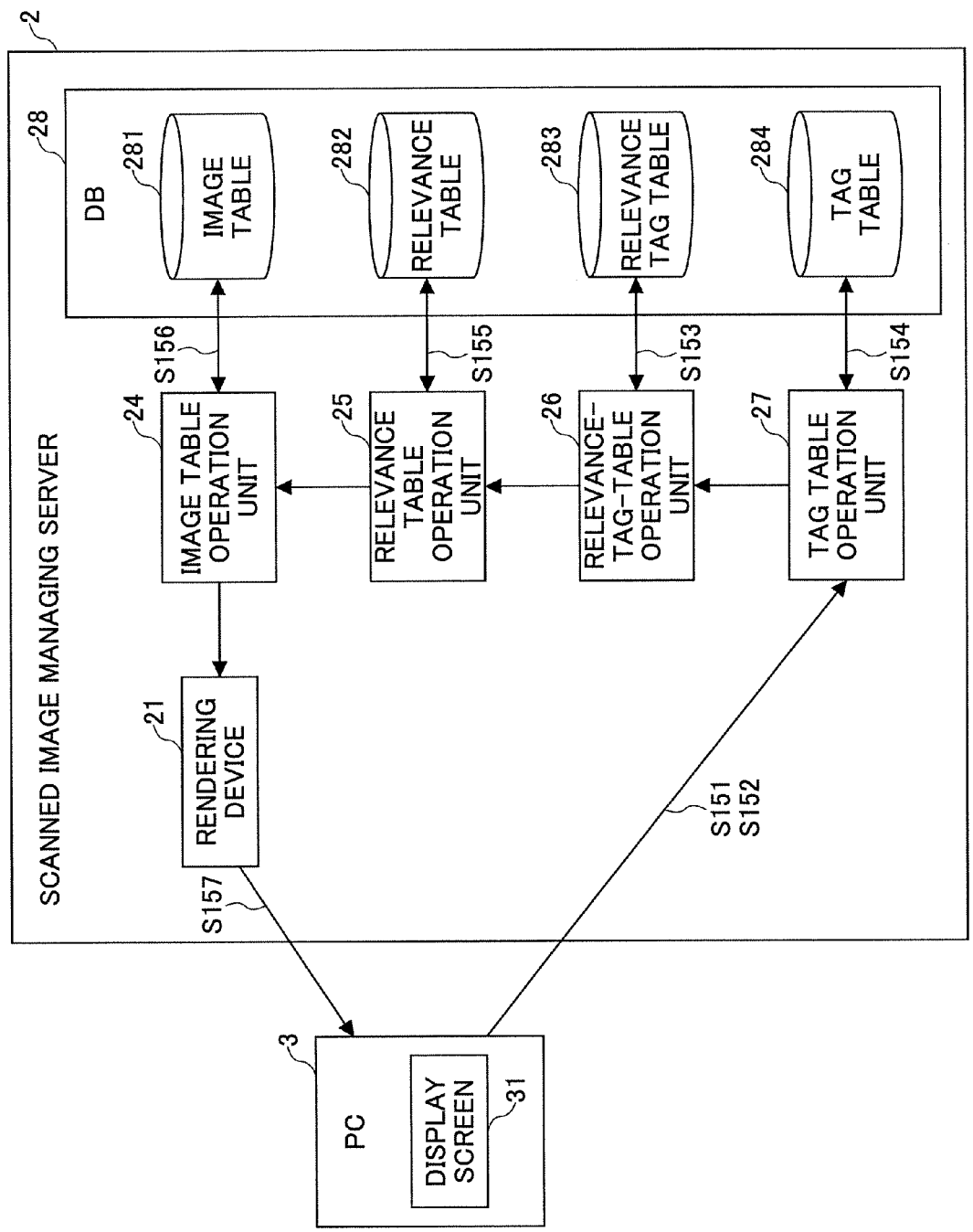
FIG. 40 is a diagram showing the procedure of retrieving a target scanned image using relevance tags.
Figure 41:
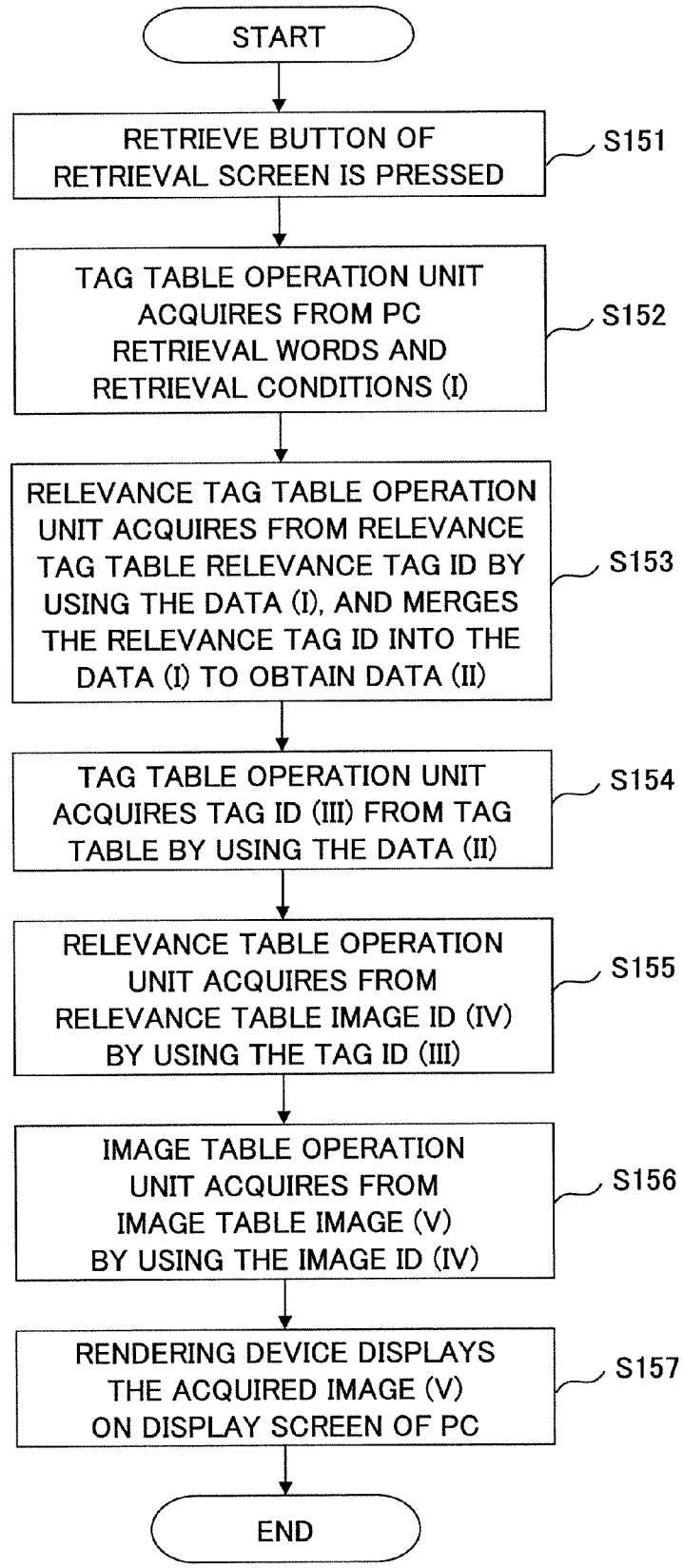
FIG. 41 is a flowchart for explaining the procedure of retrieving a target scanned image using relevance tags.

FIG. 40 is a diagram showing the procedure of retrieving a target scanned image using relevance tags, and FIG. 41 is a flowchart for explaining the procedure of retrieving a target scanned image using relevance tags.

As shown in FIGS. 40 and 41, the "retrieve" button of the retrieval screen is pressed (step S151). Then, the tag table operation unit 27 acquires the retrieval word and retrieval condition (I) from the PC 3 (step S152).

The relevance-tag-table operation unit 26 acquires a relevance tag ID from the relevance tag table 283 by using the retrieval word and retrieval condition (I) and merges the relevance tag ID into a set of tag IDs (II) (step S153).

The tag table operation unit 27 acquires a set of tag IDs (III) from the tag table 284 by using the tag IDs (II) (step S154). And the relevance table operation unit 25 acquires an image ID (IV) from the relevance table 282 by using the tag IDs (III) (step S155).

The image table operation unit 24 acquires a target scanned image (V) from the image table 281 by using the image ID (IV) (step S156). And the rendering device 21 displays the acquired image (V) on the display screen 31 of the PC 3 (step S157).

Figure 42:
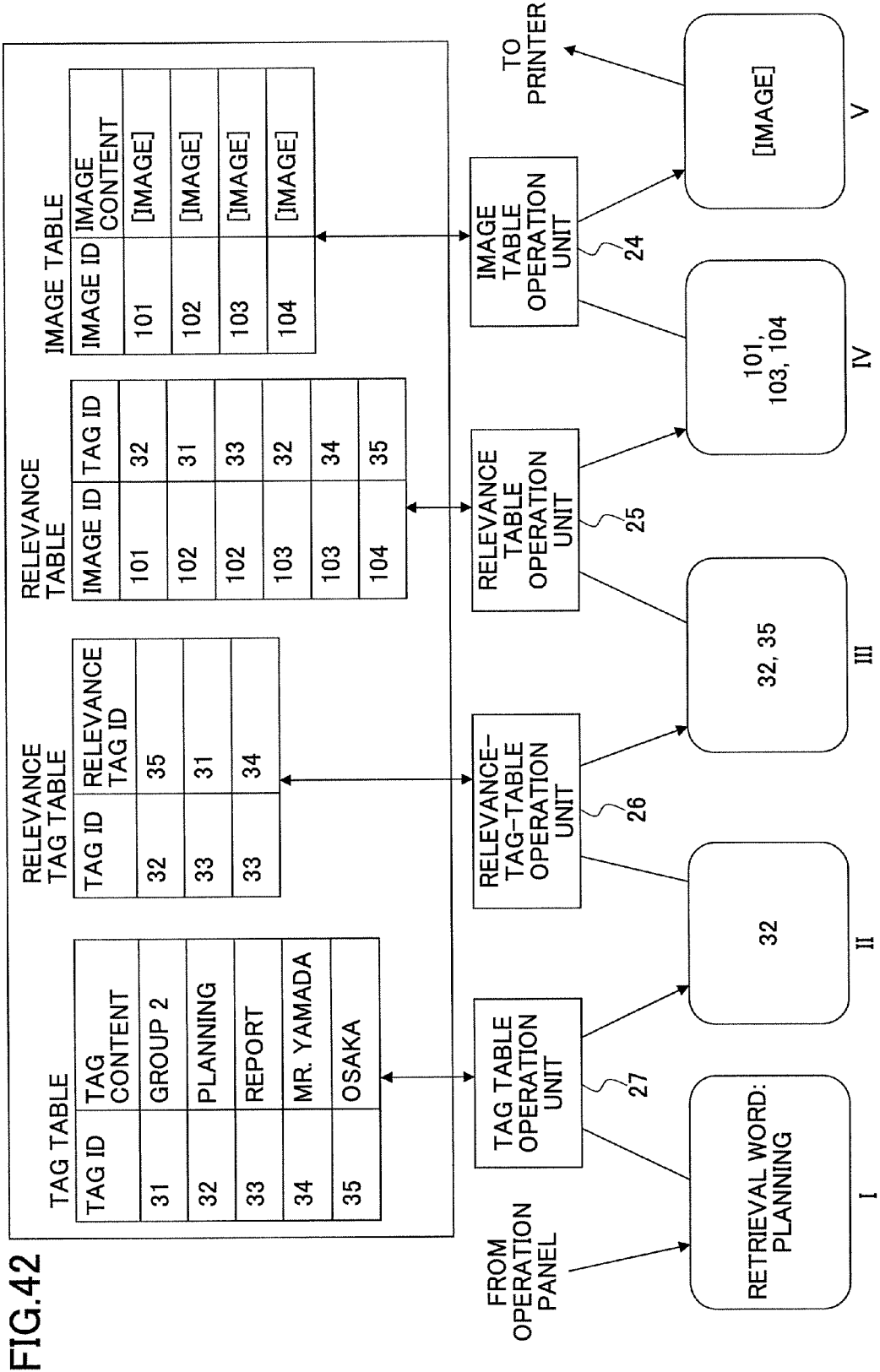
FIG. 42 is a diagram showing the database operation in the retrieving using relevance tags.

FIG. 42 is a diagram showing the database operation in the retrieving using the relevance tags. In FIG. 42, the reference characters I-V which respectively indicate the states corresponding to the states indicated by the same reference characters in the flowchart of FIG. 41 are given.

Figure 43:
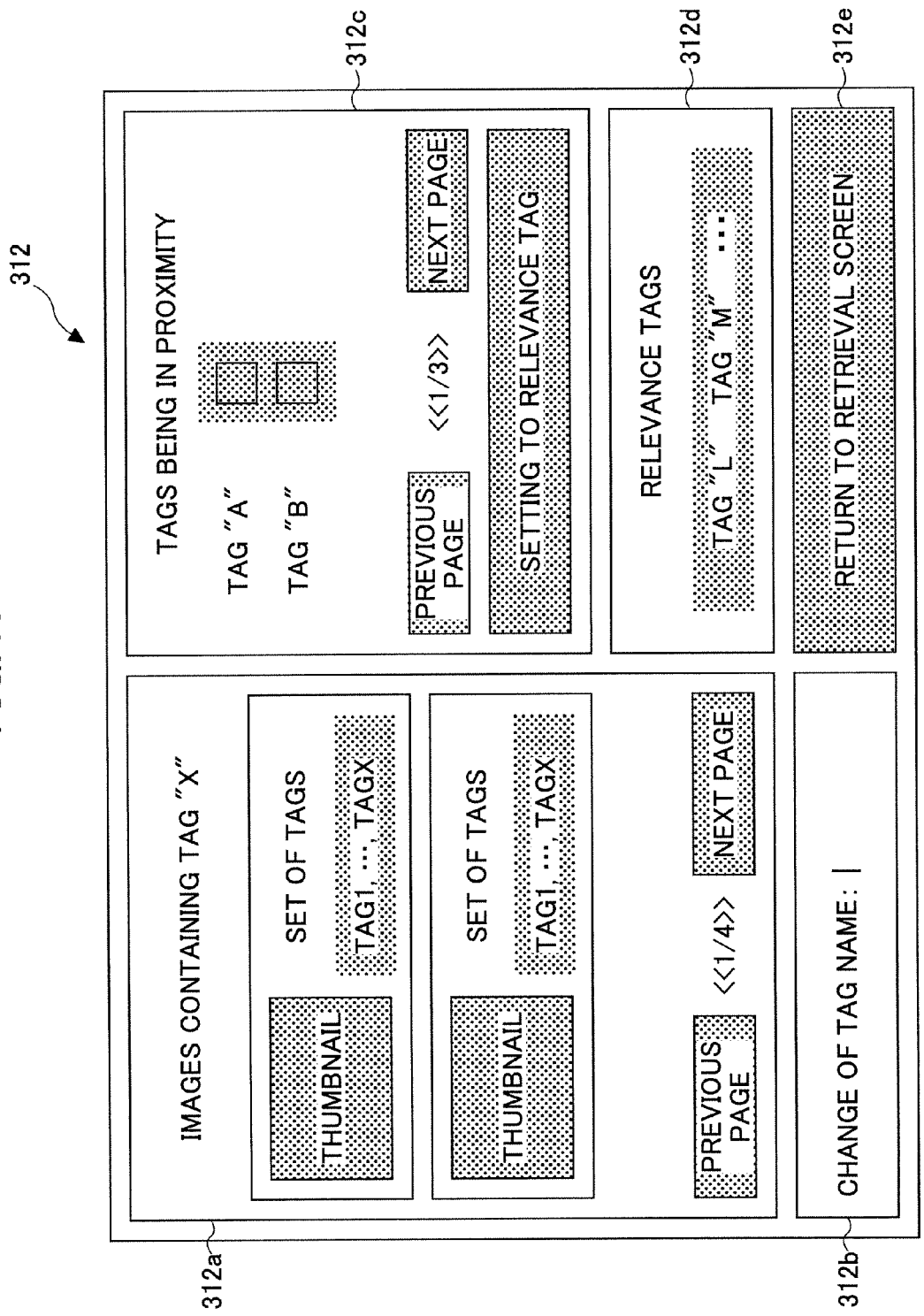
FIG. 43 is a diagram showing an example of a tag presentation screen.

FIG. 43 is a diagram showing an example of the tag presentation screen 312. As shown in FIG. 43, the tag presentation screen 312 comprises an area 312a in which the images containing the tag (X) that is searched in the retrieval screen 311 are displayed (the images displayed in order of the time of updating), an area 312b in which a tag-name-change frame for inputting a changed tag name from the keyboard is displayed, an area 312c in which tags (proximity tags) in proximity of the searched tag (X) (the tags being displayed in order of similarity) are displayed and they can be set up to relevance tags, an area 312d in which the set-up relevance tags are displayed, and an area 312e in which the return button for returning to the retrieval screen is displayed. In addition, a print button may also be provided in the tag presentation screen 312.

Figure 44:
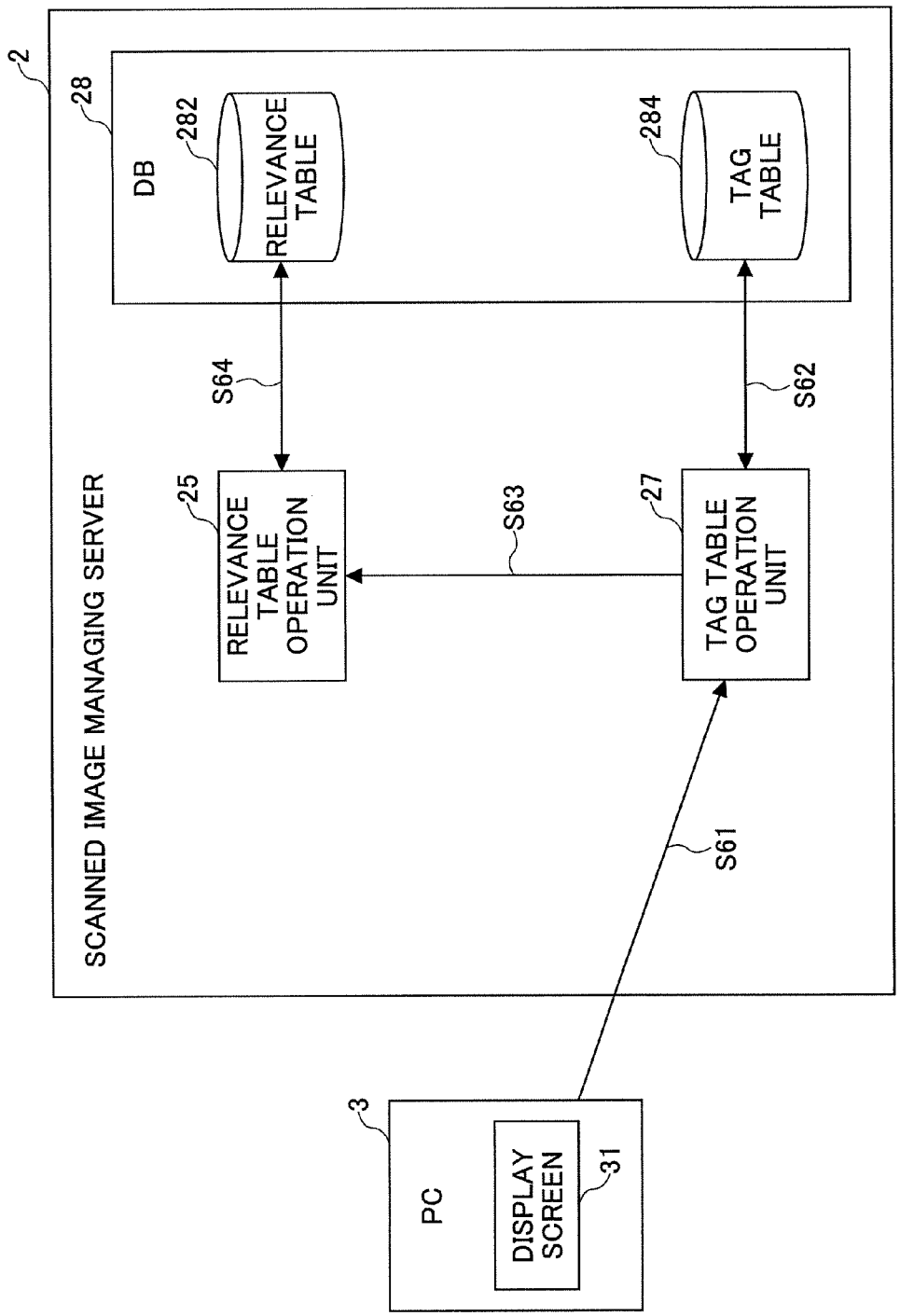
FIG. 44 is a diagram showing the procedure of changing a tag name.

FIG. 44 is a diagram showing the procedure of changing a tag name. As shown in FIG. 44, the tag table operation unit 27 of the scanned image managing server 2 receives a previous tag name before change and a new tag name after change from the PC 3 (step S61). The tag table operation unit 27 determines whether the new tag name exists in the tag table 284 of the database 28. When it does not exist, the tag character string in the tag table 284 is replaced with the new tag name (step S62). In this case, the processing is ended.

On the other hand, when the new tag name exists in the tag table 284, the tag character string in the tag table 284 is replaced with the new tag name and the corresponding tag ID in the tag table 284 is set to the existing tag ID (step S62).

And the tag table operation unit 27 causes the relevance table operation unit 25 to change the corresponding tag ID in the relevance table 282 similarly (steps S63 and S64).

Figure 45:
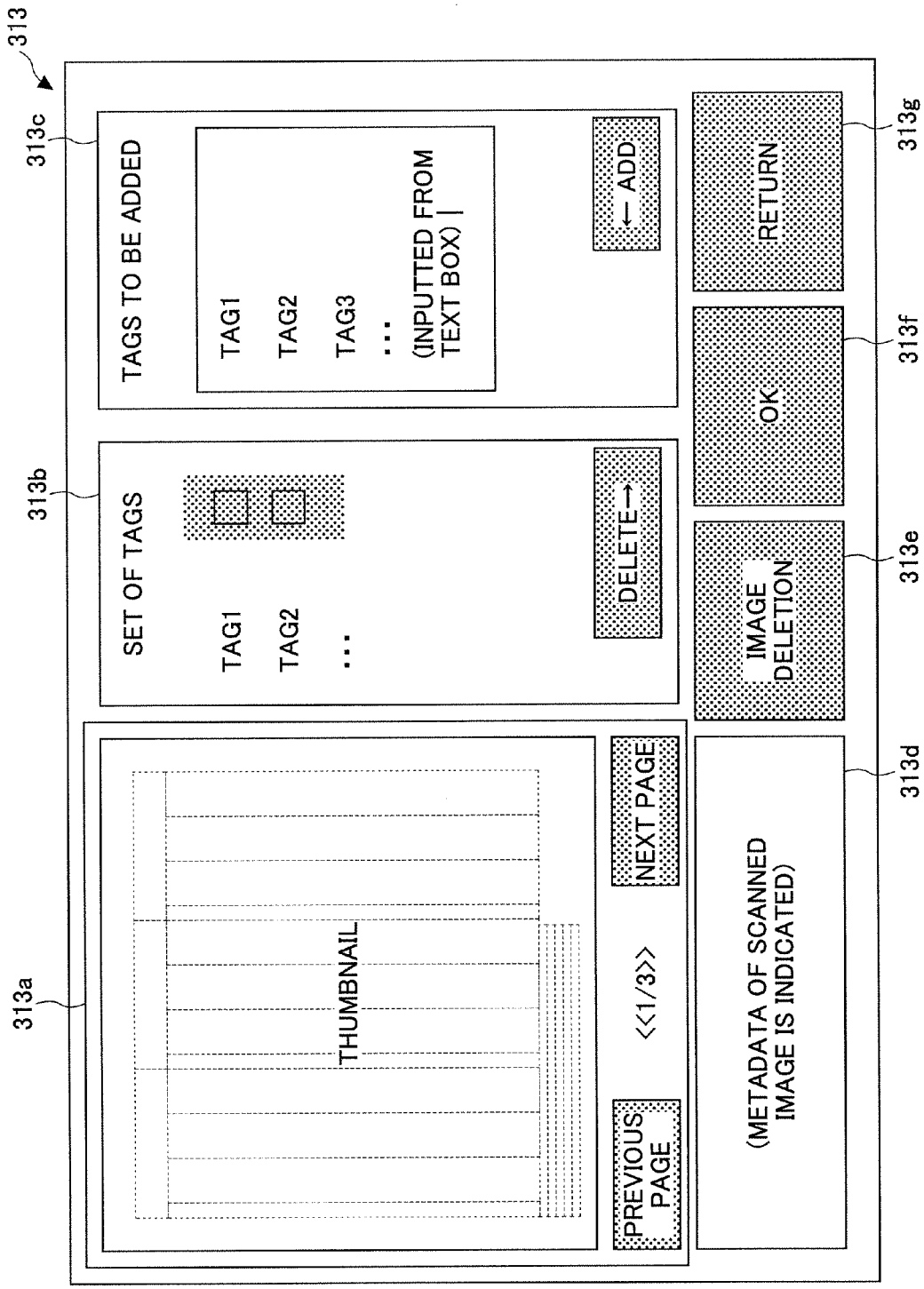
FIG. 45 is a diagram showing an example of an image-presentation/tag-change screen.

FIG. 45 is a diagram showing an example of the image-presentation/tag-change screen 313. As shown in FIG. 45, the image-presentation/tag-change screen 313 comprises an area 313a in which a thumbnail of the searched image is displayed (turning over of the page of the thumbnail of the searched image in the area 313a according to the sequence of the images in the screen 312 is also possible), an area 313b in which a set of the set-up tags is displayed, an area 313c in which a set of the tags to be added is displayed, an area 313d in which the metadata is displayed, an area 313e in which the image deletion button is displayed, an area 313f in which the OK button is displayed, and an area 313g in which the return button is displayed.

Operation in the image-presentation/tag-change screen 313 on the PC 3 is essentially the same as that in the image-presentation/tag-change/printing screen 113 on the operation panel 11 of the MFP 1, and a description thereof will be omitted.

Figure 46:
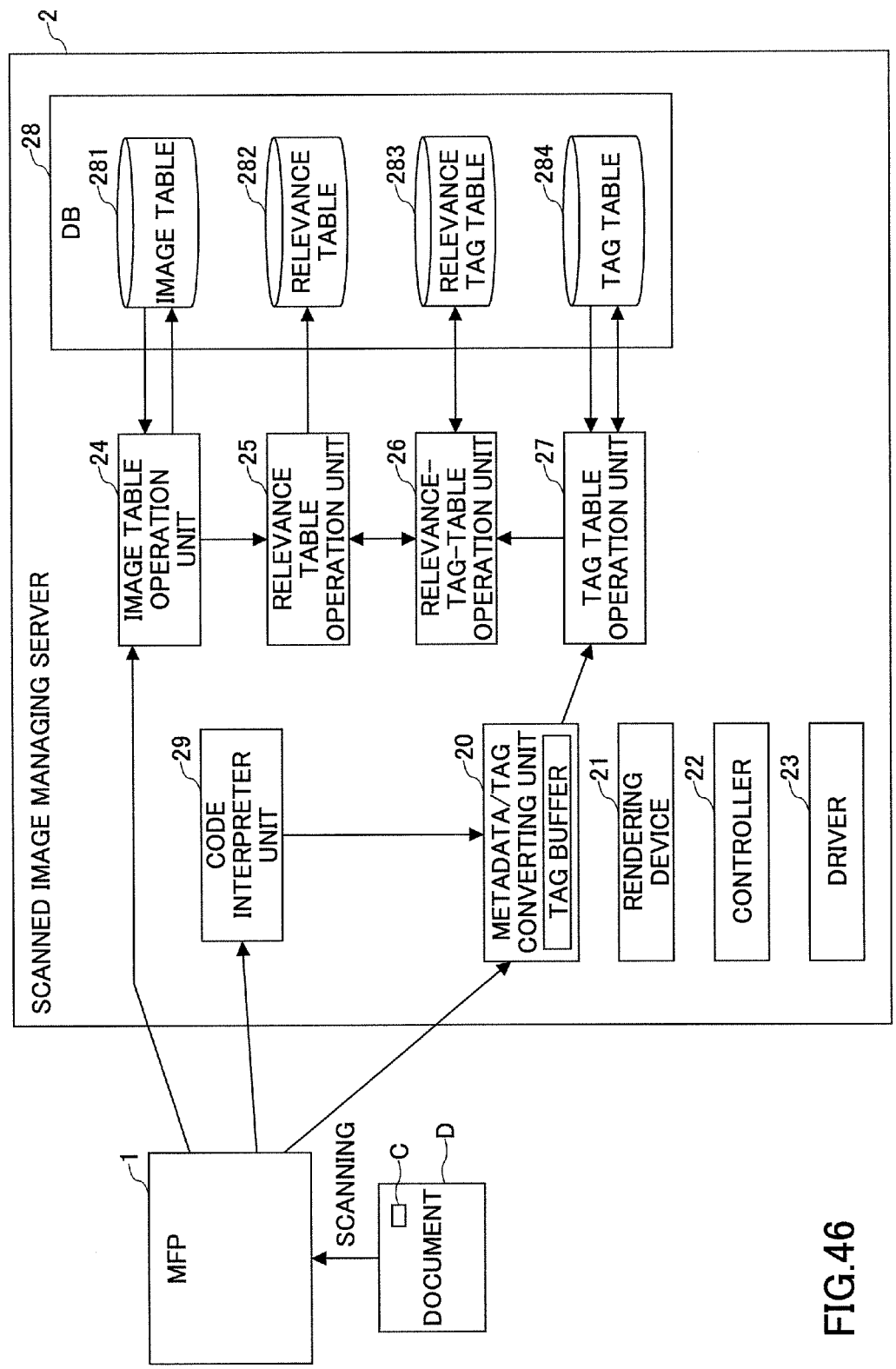
FIG. 46 is a diagram showing the procedure of registration of an image containing an identification code.

FIG. 46 is a diagram showing the procedure of registration of an image containing an identification code. In this example, it is supposed that an identification code C, such as a QR (quick response) code, which is created by encoding the tag information, is attached to a document D which is to be scanned by the MFP 1.

As shown in FIG. 46, a code interpreter unit 29 is additionally provided in the scanned image managing server 2. This code interpreter unit 29 is provided so that the identification code C is acquired from a scanned image of the document D which is received from the MFP 1, the identification code C is decoded to extract the tag information, and the extracted tag information is transferred to the metadata/tag converting unit 20. Other composition of the scanned image managing server 2 shown in FIG. 46 is essentially the same as that of the scanned image managing server 2 shown in FIG. 1, and a description thereof will be omitted.

In this way, it is possible to attach the tag information specified by the identification code C to the scanned image of the document D and register the scanned image with the tag information. For example, it is conceivable that an icon (or graphical user interface) of a QR Code is provided for each of the projects and the icon is given to each document of the project concerned. In such a case, only by scanning the document, a scanned image to which an association with the project concerned is given can be registered. In addition, a seal-like icon of QR Code can also be used.

As mentioned above, the scanned image management device in the embodiment of the invention is constructed by introducing the so-called tag system, and the ease of retrieval and the reusability of scanned images can be increased by generating associations between tags independently defined for the scanned images and registering the associations. Conventionally, there are known the method for searching images using the keywords given to the image files, and the method for associating the correlations of the keywords in a thesaurus manner. However, the associations are set up in a fixed manner by the management system, and the user is not permitted to generate associations arbitrarily. In this respect, in the embodiment of the invention, the user is permitted to generate associations between tags independently defined for the scanned images arbitrarily and register them. It is possible for the embodiment of the invention to attain presentation of a different view and discovery of an unexpected association.

The present invention is not limited to the above-described embodiments, and variations and modifications may be made without departing from the scope of the present invention.

Further, the present application is based on and claims the benefit of priority of Japanese patent application No. 2005-357618, filed on Dec. 12, 2005, and Japanese patent application No. 2006-320472, filed on Nov. 28, 2006, the entire contents of which are hereby incorporated by reference.

What is claimed is:

1. A scanned image management device comprising:
   a receiving device to receive a scanned image;
   a selecting device to prompt a user to select a tag from among a set of pre-defined tags or newly generated tags;
   a first registering device to generate an image-to-tag association between the received scanned image and a selected tag to register the received scanned image with the image-to-tag association;
   a second registering device to generate a tag-to-tag association between the selected tag and a second tag associated with a target scanned image to register the second tag with the tag-to-tag association; and
   a retrieving device to retrieve the target scanned image by using the tag-to-tag association to independently associate the second tag from other tags with the selected tag upon reception of search criteria specifying the selected tag.

2. The scanned image management device according to claim 1, further comprising:
   a relevance tag setting device to determine automatically a relevance tag which is set with respect to the tag associated with the scanned image.

3. The scanned image management device according to claim 1, further comprising:
   a tag deletion device to delete the tag associated with the scanned image.

4. The scanned image management device according to claim 1, further comprising:
   a tag addition unit to add a newly generated tag which is associated with the scanned image.

5. The scanned image management device according to claim 1, further comprising:
   a UI screen generating device to generate a user-interface screen which is displayed on an operation panel of a multi-function peripheral or a display monitor of a personal computer.

6. The scanned image management device according to claim 5, wherein the UI screen generating device is configured to generate a user-interface screen which is displayed on the operation panel of the multi-function peripheral, the user-interface screen including a scanning waiting screen as a startup screen, a tag presentation screen for performing setting of relevance tags, and an image-presentation/tag-change/printing screen for performing image checking, tag changing and image printing.

7. The scanned image management device according to claim 5, wherein the UI screen generating device is configured to generate a user-interface screen which is displayed on the display screen of the personal computer, the user-interface screen including a retrieval screen as a startup screen, a tag presentation screen for performing setting of relevance tags, and an image-presentation/tag-change screen for performing image checking and tag changing.

8. The scanned image management device according to claim 1, wherein the scanned image management device comprises a non-transitory computer-readable storage medium including:
   an image table in which image IDs and image files are associated and managed;
   a relevance table in which image IDs and tag IDs are associated and managed;
   a relevance tag table in which tag IDs and relevance tag IDs are associated and managed; and
   a tag table in which tag IDs and tag character strings are associated and managed.

9. The scanned image management device according to claim 8, wherein the scanned image management device comprises:
   an image table operation device configured to operate the image table;
   a relevance table operation device configured to operate the relevance table;
   a relevance tag table device configured to operate the relevance tag table; and
   a tag table operation device configured to operate the tag table.

10. A scanned image management method comprising:
    receiving a scanned image;
    prompting, by a selecting device, a user to select a tag from among a set of pre-defined tags or newly generated tags;
    generating, by a first registering device, an image-to-tag association between a received scanned image and the selected tag to register the received scanned image with the image-to-tag association;
    generating, by a second registering device, a tag-to-tag association between the selected tag and a second tag associated with a target scanned image to register the second tag with the tag-to-tag association; and
    retrieving, by the retrieving device, the target scanned image by using the tag-to-tag association to independently associate the second tag from other tags with the selected tag upon reception of search criteria specifying the selected tag.

11. The scanned image management device according to claim 1, wherein only newly generated tags are selected.

12. The scanned image management method according to claim 10, wherein only newly generated tags are selected.

* * * * *